(12) United States Patent
Armstrong et al.

(10) Patent No.: US 9,201,420 B2
(45) Date of Patent: *Dec. 1, 2015

(54) METHOD AND APPARATUS FOR PERFORMING A FUNCTION IN A PROCESS PLANT USING MONITORING DATA WITH CRITICALITY EVALUATION DATA

(75) Inventors: Stephen Armstrong, Savage, MN (US);
Scott N. Hokeness, Lakeville, MN (US);
Augustine Di Giovanni, Knoxville, TN (US)

(73) Assignee: ROSEMOUNT, INC., Eden Prairie, MN (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/241,384

(22) Filed: Sep. 30, 2005

(65) Prior Publication Data

US 2006/0241907 A1    Oct. 26, 2006

Related U.S. Application Data

(60) Provisional application No. 60/669,573, filed on Apr. 8, 2005, provisional application No. 60/669,572, filed on Apr. 8, 2005.

(51) Int. Cl.
*G05B 23/02* (2006.01)
(52) U.S. Cl.
CPC ................................. *G05B 23/0218* (2013.01)
(58) Field of Classification Search
USPC ............ 700/12, 108, 79, 80, 83, 28; 702/182, 702/184
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,701,280 A | 10/1972 | Stroman | 73/194 |
| 3,705,516 A | 12/1972 | Reis | 73/659 |
| 3,981,836 A | 9/1976 | Pangle, Jr. et al. | 524/549 |
| RE29,383 E | 9/1977 | Gallatin et al. | 137/14 |
| 4,058,275 A | 11/1977 | Banks et al. | 244/3.15 |
| 4,099,413 A | 7/1978 | Ohte et al. | 374/175 |
| 4,322,976 A | 4/1982 | Sisson et al. | 73/659 |
| 4,337,516 A | 6/1982 | Murphy et al. | 364/551 |

(Continued)

FOREIGN PATENT DOCUMENTS

| | | |
|---|---|---|
| CN | 85101123 A | 1/1987 |
| CN | 1097804 | 1/1995 |

(Continued)

OTHER PUBLICATIONS

International Search Report for International Application No. PCT/US2006/029986 dated Jan. 25, 2007.

(Continued)

*Primary Examiner* — Sean Shechtman
*Assistant Examiner* — Steven Garland
(74) *Attorney, Agent, or Firm* — Marshall, Gerstein & Borun LLP

(57) ABSTRACT

A method and system for monitoring an entity within a process plant includes collecting entity status data pertaining to the status of an entity within the process plant collecting criticality data pertaining to the importance of the entity within the process plant, and using the entity status data and the criticality data to perform a function within the process plant.

61 Claims, 17 Drawing Sheets

(56) References Cited

U.S. PATENT DOCUMENTS

| | | | |
|---|---|---|---|
| 4,408,285 A | 10/1983 | Sisson et al. | 364/508 |
| 4,425,798 A | 1/1984 | Nagai et al. | 73/659 |
| 4,435,770 A | 3/1984 | Shiohata et al. | 364/508 |
| 4,493,042 A | 1/1985 | Shima et al. | 364/507 |
| 4,517,468 A | 5/1985 | Kemper et al. | 290/52 |
| 4,527,271 A | 7/1985 | Hallee et al. | 371/20 |
| 4,530,234 A | 7/1985 | Cullick et al. | 73/53 |
| 4,607,325 A | 8/1986 | Horn | 364/151 |
| 4,635,214 A | 1/1987 | Kasai et al. | 364/551 |
| 4,642,782 A | 2/1987 | Kemper et al. | 364/550 |
| 4,644,478 A | 2/1987 | Stephens et al. | 364/550 |
| 4,644,749 A | 2/1987 | Somes | 60/459 |
| 4,649,515 A | 3/1987 | Thompson et al. | 364/900 |
| 4,657,179 A | 4/1987 | Aggers et al. | 236/51 |
| 4,683,542 A | 7/1987 | Taniguti | 364/508 |
| 4,707,796 A | 11/1987 | Calabro et al. | 364/552 |
| 4,734,873 A | 3/1988 | Malloy et al. | 364/571 |
| 4,758,964 A | 7/1988 | Bittner et al. | 364/508 |
| 4,763,243 A | 8/1988 | Barlow et al. | 364/200 |
| 4,764,862 A | 8/1988 | Barlow et al. | 364/200 |
| 4,777,585 A | 10/1988 | Kokawa et al. | 364/164 |
| 4,819,233 A | 4/1989 | Delucia et al. | 371/19 |
| 4,831,564 A | 5/1989 | Suga | 364/999.999 |
| 4,843,557 A | 6/1989 | Ina et al. | 364/999.999 |
| 4,853,175 A | 8/1989 | Book | 376/216 |
| 4,873,655 A | 10/1989 | Kondraska | 364/553 |
| 4,885,694 A | 12/1989 | Pray et al. | 364/464.01 |
| 4,885,707 A | 12/1989 | Nichol et al. | 364/999.999 |
| 4,907,167 A | 3/1990 | Skeirik | 364/500 |
| 4,910,691 A | 3/1990 | Skeirik | 364/513 |
| 4,922,412 A | 5/1990 | Lane et al. | 364/157 |
| 4,924,418 A | 5/1990 | Bachman et al. | 364/550 |
| 4,934,196 A | 6/1990 | Romano | 73/999.999 |
| 4,942,514 A | 7/1990 | Miyagaki et al. | 364/190 |
| 4,944,035 A | 7/1990 | Aagardl et al. | 364/556 |
| 4,956,793 A | 9/1990 | Bonne et al. | 365/558 |
| 4,964,125 A | 10/1990 | Kim | 371/20 |
| 4,965,742 A | 10/1990 | Skeirik | 364/513 |
| 4,980,844 A | 12/1990 | Demjanenko et al. | 364/550 |
| 4,992,965 A | 2/1991 | Holter et al. | 364/999.999 |
| 5,005,142 A | 4/1991 | Lipchak et al. | 354/550 |
| 5,006,992 A | 4/1991 | Skeirik | 364/513 |
| 5,008,810 A | 4/1991 | Kessel et al. | 364/200 |
| 5,015,934 A | 5/1991 | Holley et al. | 318/611 |
| 5,018,215 A | 5/1991 | Nasr et al. | 382/15 |
| 5,043,862 A | 8/1991 | Takahashi et al. | 364/162 |
| 5,043,863 A | 8/1991 | Bristol et al. | 364/162 |
| 5,050,095 A | 9/1991 | Samad | 364/513 |
| 5,053,815 A | 10/1991 | Wendell | 355/208 |
| 5,070,458 A | 12/1991 | Gilmore et al. | 364/424 |
| 5,081,598 A | 1/1992 | Bellows et al. | 364/513 |
| 5,089,978 A | 2/1992 | Lipner et al. | 364/999.999 |
| 5,089,984 A | 2/1992 | Struger et al. | 364/200 |
| 5,094,107 A | 3/1992 | Schoch | 73/570 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 364/513 |
| 5,121,467 A | 6/1992 | Skeirik | 395/11 |
| 5,122,976 A | 6/1992 | Bellows et al. | 364/550 |
| 5,130,936 A | 7/1992 | Sheppard et al. | 364/999.999 |
| 5,134,574 A | 7/1992 | Beaverstock et al. | 364/555.01 |
| 5,140,530 A | 8/1992 | Guha et al. | 395/13 |
| 5,142,612 A | 8/1992 | Skeirik | 395/13 |
| 5,148,378 A | 9/1992 | Shibayama et al. | 364/999.999 |
| 5,161,013 A | 11/1992 | Rylander et al. | 358/160 |
| 5,167,009 A | 11/1992 | Skeirik | 395/27 |
| 5,175,678 A | 12/1992 | Frerichs et al. | 364/148 |
| 5,187,674 A | 2/1993 | Bonne | 364/558 |
| 5,193,143 A | 3/1993 | Kaemmerer et al. | 395/22 |
| 5,197,114 A | 3/1993 | Skeirik | 73/168 |
| 5,197,328 A | 3/1993 | Fitzgerald | 73/168 |
| 5,200,028 A | 4/1993 | Tatsumi | 156/656 |
| 5,200,958 A | 4/1993 | Hamilton et al. | 371/16.4 |
| 5,210,704 A | 5/1993 | Husseiny | 364/999.999 |
| 5,212,765 A | 5/1993 | Skeirik | 395/11 |
| 5,214,582 A | 5/1993 | Gray | 364/999.999 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/999.999 |
| 5,251,151 A | 10/1993 | Demjanenko et al. | 364/550 |
| 5,265,031 A | 11/1993 | Maiczewski | 364/497 |
| 5,265,222 A | 11/1993 | Nishiya et al. | 395/3 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,291,190 A | 3/1994 | Scarola et al. | 340/825.06 |
| 5,293,585 A | 3/1994 | Morita | 395/52 |
| 5,301,101 A | 4/1994 | MacArthur et al. | 364/156 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,311,447 A | 5/1994 | Bonne | |
| 5,311,562 A | 5/1994 | Palusamy | 376/215 |
| 5,315,521 A | 5/1994 | Hanson et al. | 364/468 |
| 5,317,520 A | 5/1994 | Castle | 364/482 |
| 5,325,522 A | 6/1994 | Vaughn | 364/600 |
| 5,327,357 A | 7/1994 | Feinstein et al. | 364/502 |
| 5,329,443 A | 7/1994 | Bonaquist et al. | 364/153 |
| 5,333,240 A | 7/1994 | Matsumoto et al. | 395/23 |
| 5,333,298 A | 7/1994 | Bland et al. | |
| 5,347,449 A | 9/1994 | Meyer et al. | 364/185 |
| 5,349,541 A | 9/1994 | Alexandro, Jr. et al. | 364/578 |
| 5,351,184 A | 9/1994 | Lu et al. | 364/165 |
| 5,353,207 A | 10/1994 | Keeler et al. | 364/164 |
| 5,353,315 A | 10/1994 | Scarola et al. | 376/259 |
| 5,361,612 A | 11/1994 | Voiculescu et al. | 70/241 |
| 5,369,599 A | 11/1994 | Sadjadi et al. | 364/516 |
| 5,373,452 A | 12/1994 | Guha | 364/550 |
| 5,384,698 A | 1/1995 | Jelinek | 364/149 |
| 5,384,699 A | 1/1995 | Levy et al. | 364/999.999 |
| 5,386,373 A | 1/1995 | Keeler et al. | 364/577 |
| 5,390,287 A | 2/1995 | Obata | 395/67 |
| 5,390,326 A | 2/1995 | Shah | 395/575 |
| 5,394,341 A | 2/1995 | Kepner | 364/999.999 |
| 5,394,543 A | 2/1995 | Hill et al. | 395/575 |
| 5,396,415 A | 3/1995 | Konar et al. | 364/162 |
| 5,398,303 A | 3/1995 | Tanaka | 395/51 |
| 5,400,246 A | 3/1995 | Wilson et al. | 364/146 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/999.999 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,442,544 A | 8/1995 | Jelinek | 364/149 |
| 5,461,570 A | 10/1995 | Wang et al. | 364/468 |
| 5,467,355 A | 11/1995 | Umeda et al. | 371/29.1 |
| 5,469,735 A | 11/1995 | Watanabe | 73/118.1 |
| 5,483,387 A | 1/1996 | Bauhahn et al. | 359/885 |
| 5,485,753 A | 1/1996 | Burns et al. | 73/720 |
| 5,486,920 A | 1/1996 | Killpatrick et al. | 356/350 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,499,188 A | 3/1996 | Kline, Jr. et al. | 364/468 |
| 5,500,941 A | 3/1996 | Gil | 395/183.14 |
| 5,511,004 A | 4/1996 | Dubost et al. | 364/999.999 |
| 5,511,442 A | 4/1996 | Tame | 74/502.6 |
| 5,521,814 A | 5/1996 | Teran et al. | 700/266 |
| 5,521,842 A | 5/1996 | Yamanda | 364/999.999 |
| 5,528,510 A | 6/1996 | Kraft | 364/488 |
| 5,533,413 A | 7/1996 | Kobayashi | 73/865.9 |
| 5,537,310 A | 7/1996 | Tanake et al. | 364/151 |
| 5,541,833 A | 7/1996 | Bristol et al. | 364/165 |
| 5,546,301 A | 8/1996 | Agrawal et al. | 364/140 |
| 5,548,528 A | 8/1996 | Keeler et al. | 364/497 |
| 5,559,690 A | 9/1996 | Keeler et al. | 364/497 |
| 5,561,599 A | 10/1996 | Lu | 364/165 |
| 5,566,065 A | 10/1996 | Hansen et al. | 364/164 |
| 5,570,282 A | 10/1996 | Hansen et al. | 364/164 |
| 5,570,300 A | 10/1996 | Henry et al. | 364/148 |
| 5,572,420 A | 11/1996 | Lu | 364/153 |

(56) References Cited

U.S. PATENT DOCUMENTS

| | | |
|---|---|---|
| 5,574,638 A | 11/1996 | Lu ................................. 364/165 |
| 5,586,066 A | 12/1996 | White et al. .................. 364/576 |
| 5,596,704 A | 1/1997 | Geddes et al. |
| 5,598,521 A | 1/1997 | Kilgore et al. ................ 395/155 |
| 5,600,148 A | 2/1997 | Cole et al. ................. 250/495.1 |
| 5,602,757 A | 2/1997 | Haseley et al. ......... 364/999.999 |
| 5,602,761 A | 2/1997 | Spoerre et al. ............... 364/554 |
| 5,604,914 A | 2/1997 | Kabe ............................ 395/800 |
| 5,610,339 A | 3/1997 | Haseley et al. ................ 73/660 |
| 5,623,598 A | 4/1997 | Voigt et al. .............. 395/184.01 |
| 5,625,574 A | 4/1997 | Griffiths et al. .............. 364/550 |
| 5,631,825 A | 5/1997 | Van Wheel et al. ........... 700/83 |
| 5,640,491 A | 6/1997 | Bhat et al. ..................... 395/22 |
| 5,640,493 A | 6/1997 | Skeirik ........................... 395/23 |
| 5,646,350 A | 7/1997 | Robinson et al. .............. 73/602 |
| 5,666,297 A | 9/1997 | Britt et al. .................... 364/578 |
| 5,671,335 A | 9/1997 | Davis et al. .................... 395/23 |
| 5,671,351 A | 9/1997 | Wild et al. .............. 395/183.14 |
| 5,675,504 A | 10/1997 | Serodes et al. .............. 364/496 |
| 5,680,409 A | 10/1997 | Qin et al. ........................ 371/48 |
| 5,682,309 A | 10/1997 | Bartusiak et al. ............. 364/149 |
| 5,687,090 A | 11/1997 | Chen et al. ................... 364/496 |
| 5,691,895 A | 11/1997 | Kurtzberg et al. ............ 700/29 |
| 5,692,158 A | 11/1997 | Degeneff et al. ............. 395/500 |
| 5,698,788 A | 12/1997 | Mol et al. ........................ 73/659 |
| 5,704,011 A | 12/1997 | Hansen et al. .................. 395/22 |
| 5,715,158 A | 2/1998 | Chen ............................ 364/150 |
| 5,729,661 A | 3/1998 | Keeler et al. ................ 395/213 |
| 5,740,324 A | 4/1998 | Mathur et al. .................. 395/22 |
| 5,742,513 A | 4/1998 | Bouhenguel et al. ......... 364/492 |
| 5,754,451 A | 5/1998 | Williams ..................... 702/185 |
| 5,757,371 A | 5/1998 | Oran et al. ..................... 345/348 |
| 5,761,518 A | 6/1998 | Boehling et al. .............. 364/492 |
| 5,764,891 A | 6/1998 | Warrior ...................... 395/200.2 |
| 5,768,119 A | 6/1998 | Havekost et al. ............. 364/133 |
| 5,777,872 A | 7/1998 | He ................................. 364/149 |
| 5,781,432 A | 7/1998 | Keeler et al. ................. 364/164 |
| 5,781,878 A | 7/1998 | Mizoguchi et al. ........... 701/109 |
| 5,790,898 A | 8/1998 | Kishima et al. .............. 395/899 |
| 5,796,602 A | 8/1998 | Wellan et al. ................. 364/130 |
| 5,796,606 A | 8/1998 | Spring .......................... 364/138 |
| 5,796,609 A | 8/1998 | Tao et al. ..................... 364/164 |
| 5,798,939 A | 8/1998 | Ochoa et al. ................. 364/493 |
| 5,805,442 A | 9/1998 | Crater et al. ................. 364/138 |
| 5,809,490 A | 9/1998 | Guiver et al. ................. 706/16 |
| 5,819,050 A | 10/1998 | Boehling et al. ............. 395/284 |
| 5,819,232 A | 10/1998 | Shipman ........................ 705/8 |
| 5,825,645 A | 10/1998 | Konar et al. .................. 364/148 |
| 5,826,249 A | 10/1998 | Skeirik .......................... 706/25 |
| 5,838,561 A | 11/1998 | Owen ............................ 364/152 |
| 5,842,189 A | 11/1998 | Keeler et al. .................. 706/16 |
| 5,847,952 A | 12/1998 | Samad .......................... 364/148 |
| 5,848,365 A | 12/1998 | Coverdill ........................ 701/35 |
| 5,855,791 A | 1/1999 | Hays et al. .................... 210/696 |
| 5,859,773 A | 1/1999 | Keeler et al. ................. 364/164 |
| 5,859,885 A | 1/1999 | Rusnica et al. ............... 376/259 |
| 5,859,964 A | 1/1999 | Wang et al. ............. 395/185.01 |
| 5,875,420 A | 2/1999 | Piety et al. .................... 702/182 |
| 5,877,954 A | 3/1999 | Klimasauskas et al. ...... 364/149 |
| 5,880,716 A | 3/1999 | Kunugi ......................... 345/173 |
| 5,892,679 A | 4/1999 | He ................................. 364/149 |
| 5,892,939 A | 4/1999 | Call et al. ..................... 395/500 |
| 5,898,869 A | 4/1999 | Anderson ..................... 395/652 |
| 5,901,058 A | 5/1999 | Steinman et al. ............. 364/130 |
| 5,905,989 A | 5/1999 | Biggs ........................... 707/104 |
| 5,906,214 A | 5/1999 | Gueret ......................... 395/835 |
| 5,907,701 A | 5/1999 | Hanson ........................ 132/314 |
| 5,909,370 A | 6/1999 | Lynch .......................... 395/671 |
| 5,909,541 A | 6/1999 | Sampson et al. ........ 395/182.04 |
| 5,909,586 A | 6/1999 | Anderson ............... 395/750.08 |
| 5,917,840 A | 6/1999 | Cheney et al. ................. 371/53 |
| 5,918,233 A | 6/1999 | La Chance et al. ........... 707/104 |
| 5,922,963 A | 7/1999 | Piety et al. ...................... 73/659 |
| 5,924,086 A | 7/1999 | Mathur et al. .................. 706/25 |
| 5,940,290 A | 8/1999 | Dixon ........................... 364/138 |
| 5,948,101 A | 9/1999 | David et al. ..................... 713/2 |
| 5,949,417 A | 9/1999 | Calder .......................... 345/342 |
| 5,951,654 A | 9/1999 | Avsan et al. ...................... 710/5 |
| 5,960,214 A | 9/1999 | Sharpe, Jr. et al. ........... 395/835 |
| 5,960,441 A | 9/1999 | Bland et al. .................. 707/104 |
| 5,975,737 A | 11/1999 | Crater et al. .................. 364/138 |
| 5,984,502 A | 11/1999 | Calder .......................... 364/188 |
| 5,988,847 A | 11/1999 | McLaughlin et al. ........ 364/138 |
| 5,995,916 A | 11/1999 | Nixon et al. .................. 702/182 |
| 5,997,167 A | 12/1999 | Crater et al. ..................... 700/79 |
| 6,006,171 A | 12/1999 | Vines et al. ................... 702/184 |
| 6,008,985 A | 12/1999 | Lake et al. .................... 361/686 |
| 6,014,612 A | 1/2000 | Larson et al. ................. 702/183 |
| 6,017,143 A | 1/2000 | Eryurek et al. .......... 364/148.06 |
| 6,026,352 A | 2/2000 | Burns et al. .................. 702/182 |
| 6,033,257 A | 3/2000 | Lake et al. .................... 439/502 |
| 6,035,339 A | 3/2000 | Agraharam et al. .......... 709/234 |
| 6,038,486 A | 3/2000 | Saitoh et al. .................... 700/96 |
| 6,041,263 A | 3/2000 | Boston et al. ................... 700/32 |
| 6,047,221 A | 4/2000 | Piche et al. ..................... 700/44 |
| 6,055,483 A | 4/2000 | Lu ................................. 702/31 |
| 6,061,603 A | 5/2000 | Papadopoulos et al. ....... 700/83 |
| 6,067,505 A | 5/2000 | Bonoyer et al. ................. 702/85 |
| 6,076,124 A | 6/2000 | Korowitz et al. ............. 710/102 |
| 6,078,843 A | 6/2000 | Shavit ............................. 700/48 |
| 6,093,211 A | 7/2000 | Hamielec et al. .............. 703/12 |
| 6,106,785 A | 8/2000 | Havlena et al. ............... 422/109 |
| 6,108,616 A | 8/2000 | Borchers et al. .............. 702/183 |
| 6,110,214 A | 8/2000 | Klimasaukas .................... 703/2 |
| 6,122,555 A | 9/2000 | Lu ..................................... 700/9 |
| 6,128,279 A | 10/2000 | O'Neil et al. ................. 370/229 |
| 6,134,574 A | 10/2000 | Oberman et al. ............. 708/551 |
| 6,144,952 A | 11/2000 | Keeler et al. .................... 706/21 |
| 6,169,980 B1 | 1/2001 | Keeler et al. .................... 706/21 |
| 6,185,470 B1 | 2/2001 | Pado et al. .................... 700/104 |
| 6,192,281 B1 | 2/2001 | Brown et al. .................... 700/2 |
| 6,197,480 B1 | 3/2001 | Iguchi et al. ................. 430/286.1 |
| 6,246,972 B1 | 6/2001 | Klimasauskas .................. 703/2 |
| 6,259,959 B1 | 7/2001 | Martin ............................ 700/99 |
| 6,266,726 B1 | 7/2001 | Nixon et al. .................. 710/105 |
| 6,298,377 B1 | 10/2001 | Hartikainen et al. ......... 709/223 |
| 6,298,454 B1 | 10/2001 | Schleiss et al. ................ 714/37 |
| 6,317,638 B1 | 11/2001 | Schreder et al. ................ 700/79 |
| 6,317,701 B1 | 11/2001 | Pyötsiä et al. ................ 702/188 |
| 6,332,110 B1 | 12/2001 | Wolfe ............................ 702/22 |
| 6,389,331 B1 | 5/2002 | Jensen et al. .................. 700/275 |
| 6,397,114 B1 | 5/2002 | Eryurek et al. .......... 364/999.999 |
| 6,400,681 B1 | 6/2002 | Bertin et al. .................. 370/351 |
| 6,418,465 B1 | 7/2002 | Hirosawa et al. ............ 709/206 |
| 6,421,571 B1 | 7/2002 | Spriggs et al. .................. 700/17 |
| 6,445,963 B1 | 9/2002 | Blevins et al. .................. 700/44 |
| 6,507,797 B1 | 1/2003 | Kliman et al. ................ 702/75 |
| 6,529,780 B1 | 3/2003 | Soergel et al. ................ 700/10 |
| 6,535,769 B1 | 3/2003 | Konar ............................ 700/14 |
| 6,549,130 B1 | 4/2003 | Joao ............................. 340/539 |
| 6,557,118 B2 | 4/2003 | Schleiss et al. ................ 714/37 |
| 6,567,718 B1 | 5/2003 | Campbell et al. .............. 700/30 |
| 6,571,273 B1 | 5/2003 | Shirai et al. .................. 709/201 |
| 6,591,260 B1 | 7/2003 | Schwarzhoff et al. .......... 707/2 |
| 6,609,040 B1 | 8/2003 | Brunnemann ................ 700/108 |
| 6,615,090 B1 | 9/2003 | Blevins et al. .................. 700/26 |
| 6,628,994 B1 | 9/2003 | Turicchi et al. ................ 700/32 |
| 6,633,782 B1 | 10/2003 | Schleiss et al. ................ 700/26 |
| 6,651,012 B1 | 11/2003 | Bechhoefer ................... 702/34 |
| 6,654,697 B1 | 11/2003 | Eryurek et al. ............... 702/183 |
| 6,690,274 B1 | 2/2004 | Bristol .......................... 340/506 |
| 6,704,689 B1 | 3/2004 | Hogan et al. ................. 702/184 |
| 6,717,513 B1 | 4/2004 | Sandelman et al. .......... 340/506 |
| 6,721,609 B1 | 4/2004 | Wojsznis et al. ................ 700/28 |
| 6,732,191 B1 | 5/2004 | Baker et al. ..................... 710/1 |
| 6,738,388 B1 | 5/2004 | Stevenson et al. ............ 370/465 |
| 6,758,168 B2 | 7/2004 | Hoskinen et al. ............. 122/7 R |
| 6,760,782 B1 | 7/2004 | Swales ......................... 709/224 |
| 6,774,786 B1 | 8/2004 | Havekost et al. ............. 340/517 |
| 6,795,798 B2 | 9/2004 | Eryurek et al. ............... 702/188 |
| 6,813,532 B2 | 11/2004 | Eryurek et al. ............... 700/108 |
| 6,925,338 B2 | 8/2005 | Eryurek et al. ................. 700/30 |
| 6,954,713 B2 | 10/2005 | Eryurek ........................ 702/140 |
| 6,965,806 B2 | 11/2005 | Eryurek et al. ................. 700/96 |

(56) References Cited

U.S. PATENT DOCUMENTS

| | | | |
|---|---|---|---|
| 6,975,219 B2 | 12/2005 | Eryurek et al. | 340/517 |
| 7,079,984 B2 | 7/2006 | Eryurek et al. | 702/185 |
| 7,113,085 B2 | 9/2006 | Havekost | 340/506 |
| 2002/0022894 A1 | 2/2002 | Eryurek et al. | 709/224 |
| 2002/0029130 A1 | 3/2002 | Eryurek et al. | 702/183 |
| 2002/0067370 A1 | 6/2002 | Forney et al. | 345/733 |
| 2002/0077711 A1 | 6/2002 | Schleiss et al. | 700/83 |
| 2002/0147511 A1 | 10/2002 | Eryurek et al. | 340/517 |
| 2002/0161940 A1 | 10/2002 | Eryurek et al. | 700/108 |
| 2002/0163427 A1 | 11/2002 | Eryurek et al. | 340/500 |
| 2003/0002969 A1 | 1/2003 | Risser | 414/542 |
| 2003/0009572 A1 | 1/2003 | Thurner | 709/230 |
| 2003/0014500 A1 | 1/2003 | Schleiss et al. | 709/218 |
| 2003/0028268 A1 | 2/2003 | Eryurek et al. | 709/200 |
| 2003/0172002 A1 | 9/2003 | Spira et al. | 705/27 |
| 2003/0195934 A1 | 10/2003 | Peterson et al. | 709/206 |
| 2004/0075689 A1 | 4/2004 | Schleiss et al. | 700/83 |
| 2004/0158474 A1 | 8/2004 | Karschnia et al. | |
| 2004/0158772 A1 | 8/2004 | Pan et al. | 714/14 |
| 2004/0181364 A1 | 9/2004 | Reeves et al. | 702/182 |
| 2004/0186927 A1* | 9/2004 | Eryurek et al. | 710/12 |
| 2004/0204775 A1 | 10/2004 | Keyes et al. | 700/9 |
| 2004/0213285 A1 | 10/2004 | Stevenson et al. | 370/465 |
| 2004/0249583 A1 | 12/2004 | Eryurek et al. | 702/183 |
| 2005/0007249 A1 | 1/2005 | Eryurek et al. | 340/511 |
| 2005/0012608 A1 | 1/2005 | Havekost | 340/517 |
| 2005/0033466 A1 | 2/2005 | Eryurek et al. | 700/108 |
| 2005/0197805 A1 | 9/2005 | Eryurek et al. | 702/188 |
| 2005/0197806 A1 | 9/2005 | Eryurek et al. | 702/188 |
| 2005/0240289 A1 | 10/2005 | Hoyte et al. | 700/49 |
| 2005/0253701 A1* | 11/2005 | Parello et al. | 340/517 |
| 2006/0229848 A1* | 10/2006 | Armstrong et al. | 702/184 |

FOREIGN PATENT DOCUMENTS

| | | | | |
|---|---|---|---|---|
| CN | 1267373 | A | 9/2000 | G05B 19/408 |
| DE | 35 40204 | C1 | 9/1986 | G01K 1/20 |
| DE | 40 08 560 | A1 | 9/1990 | G07C 3/08 |
| DE | 44 33 593 | A1 | 6/1995 | G05B 13/00 |
| DE | 195 02 499 | A1 | 8/1996 | G05B 19/042 |
| EP | 0 122 622 | | 10/1984 | G01J 1/02 |
| EP | 0 377 736 | | 7/1990 | G05B 23/02 |
| EP | 0 413 814 | | 2/1991 | G01K 7/00 |
| EP | 0 487 419 | | 5/1992 | G06F 15/21 |
| EP | 0 594 227 | | 4/1994 | B30B 11/02 |
| EP | 0 612 039 | | 8/1994 | G07C 3/00 |
| EP | 0 644 470 | | 3/1995 | G05B 13/04 |
| EP | 0 362 386 | | 6/1995 | G05B 19/4063 |
| EP | 0 626 697 | | 7/1997 | G21C 17/00 |
| EP | 0 827 096 | | 3/1998 | G06F 17/40 |
| EP | 0 624 847 | | 8/1999 | G06F 17/17 |
| EP | 0 959 398 | | 11/1999 | G05B 23/02 |
| EP | 0 965 897 | | 12/1999 | G05B 19/418 |
| EP | 0 964 325 | | 8/2002 | G05B 19/406 |
| EP | 0 961 184 | | 12/2003 | G05B 19/418 |
| GB | 2 083 258 | | 3/1982 | G08B 23/00 |
| GB | 2 294 129 | | 4/1996 | G21C 17/00 |
| GB | 2 294 793 | | 5/1996 | G08B 23/00 |
| GB | 2 347 234 | | 8/2000 | G05B 23/02 |
| GB | 2 380 833 | | 4/2003 | G06F 17/30 |
| GB | 2 394 312 | | 4/2004 | G05B 13/04 |
| JP | 06242192 | | 2/1994 | G01R 31/36 |
| JP | 07234988 | | 5/1995 | G08B 31/00 |
| JP | 2000-330627 | | 11/2000 | |
| JP | 2002-373021 | | 12/2002 | |
| JP | 2003-288116 | | 10/2003 | |
| WO | WO 98/38585 | | 9/1998 | G06F 17/30 |
| WO | WO 99/13418 | | 3/1999 | G06F 13/00 |
| WO | WO 00/50851 | | 8/2000 | G01F 1/50 |
| WO | WO 02/23405 | | 3/2002 | H04L 12/24 |
| WO | WO 02/071168 | | 9/2002 | G05B 23/02 |
| WO | WO 02/071169 | | 9/2002 | G05B 23/02 |
| WO | WO 02/071170 | | 9/2002 | G05B 23/02 |
| WO | WO 02/071171 | | 9/2002 | G05B 23/02 |
| WO | WO 02/071172 | | 9/2002 | G05B 23/02 |
| WO | WO 02/071173 | | 9/2002 | G05B 23/02 |
| WO | WO 02/095509 | | 11/2002 | G05B 23/02 |
| WO | WO 02/095510 | | 11/2002 | G05B 23/02 |
| WO | WO 02/095633 | | 11/2002 | G01H 1/00 |
| WO | WO 03/075206 | | 9/2003 | G06F 17/60 |
| WO | WO 2005/093531 | | 10/2005 | G05B 23/02 |
| WO | WO 2005/093534 | | 10/2005 | G05B 23/02 |
| WO | WO 2005//093535 | | 10/2005 | G05B 23/02 |

OTHER PUBLICATIONS

International Search Report for International Application No. PCT/US2006/029865 dated Nov. 9, 2006.

Written Opinion for International Application No. PCT/US2006/029865 dated Nov. 9, 2006.

"Components of GE PREDICTOR™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE PREDICTOR™ Services: GE PREDICTOR Services Overview," GE Industrial Systems, available at http://www.geindustrial.com/cwc/services?id=71 on Jul. 18, 2002.

dotnet.za.net, "Web Services—A Guide for Business and IT Managers (Sep. 23, 2001)", (Copyright 2001), www.dotnet.za.net.

Kalkhoff, W. "Agent-Oriented Robot Task Transformation," Proceeding of the International Symposium on Intelligent Control, IEEE, pp. 242-247 (Aug. 27, 1995).

Lighthammer Software Development, "Illuminator™ The 1st 'Plant Information Portal'™" (Copyright 1999).

"Status Signals of Field Instruments," NAMUR Recommendation, NA 64, Feb. 1, 2001, pp. 1-8.

Systinet, "Introduction to Web Services", (Copyright 2001, 2002), www.systinet.com.

Zolera Systems, "A Brief Guide to Web Services Protocols" (Copyright 2001), www.zolera.com.

Examination report for European Patent Application No. 06789069.9 based on PCT/US2006/029865 dated Mar. 16, 2009.

Notification of the First Office Action—Chinese Patent Application for Invention No. 200680035701.2, dated Jan. 22, 2010.

Examination report for European Patent Application No. 06789069.9 based on PCT/US2006/029865 dated Feb. 8, 2010.

Notification of the Second Office Action in Chinese Application No. 200680035701.2 dated Jun. 30, 2011.

Decision of Rejection in JP Patent Application No. 2008-533341 dated Jun. 19, 2012.

Notice of Reasons for Rejection in Japanese Application No. 2012-231539 dated Nov. 26, 2013.

Notice of Reasons for Rejection for Japanese Application No. 2008-533343, dated Aug. 27, 2013.

Decision of Rejection in JP Patent Application No. 2012-231539 dated Feb. 10, 2015, 2 pages.

Summons to Oral Proceedings in European Application Appeal No. T2361/11-3.5.03 dated May 6, 2015, 13 pages.

* cited by examiner

AMS Suite — Asset Portal™

Dashboard | Browse | Search
Assets | Active Alerts | Event History

EMERSON Process Management

High Priority Assets with Degraded Health

| Name | Description | Priority | Health | Type | Manufacturer | Model | Oil | US | Vib | IR | iCal | WOStatus |
|---|---|---|---|---|---|---|---|---|---|---|---|---|
| FC-600 | Feed water Inlet Valve 2 | 96 | | Valve Controller | Fisher Controls International | DVC5000 | Q | | | | 1Y | Pending |
| CP-2000 | Dense Phase Compressor | 95 | 79 | Compressor | General Electric | Dense Phase Compressor | | Q | Q | | | |
| BFP#2 | 3210 Pump/Motor | 89 | 52 | Mtr/Pump | Armstrong | A 1036 | Q | Q | | | | |
| TT-630 | Compressor Core Temperature | 87 | 50 | Temperature Transmitter | Rosemount | 3244MV | | | | | 1Y | |
| GT-500 | Gas Turbine | 85 | 97 | Gas Turbine | General Electric | GT 932 | | | | | | na |
| PW-FLOWVALVE1 | Turbine Fuel Inlet Valve | 82 | 50 | Valve Controller | Fisher Controls International | DVC5000 | Q | M | M | | 6M | na |
| PWP | Recirculating Water Pump | 79 | 20 | Mtr/Pump | Armstrong | A 3402 | | | | | | |
| BLWR#1 | Blower #1 | 79 | 60 | Mtr/Blower | Willis | BL786 | | | | | | |
| PT-210_01 | Compressor Exhaust Pressure | 78 | | Pressure Transmitter | Rosemount | 1151 | | | | | 1Y | |
| WP-004 | Water Pump #4 | 76 | | Mtr/Pump | Armstrong | A-3458 | | | | | | |

METHOD AND APPARATUS FOR PERFORMING A FUNCTION IN A PROCESS PLANT USING MONITORING DATA WITH CRITICALITY EVALUATION DATA

RELATED APPLICATIONS

This patent claims priority from U.S. Provisional Application Ser. No. 60/669,573 which was filed on Apr. 8, 2005 and from U.S. Provisional Application Ser. No. 60/669,572 which was filed on Apr. 8, 2005, both of which are expressly incorporated by reference herein.

FIELD OF TECHNOLOGY

The present disclosure relates generally to process control systems within process plants and, more particularly, to monitoring assets within a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. For example, AMS Device Managet sold by Fisher-Rosemount Systems, Inc. manages and performs online monitoring of instruments, such as valves, transmitters, etc. within the process plant to provide online monitoring data, diagnostics, alerts, etc of various assets within the process plant. Likewise, there are other types of applications which are used to monitor other types of devices, such as rotating equipment and power generation and supply devices. For example, AMS Machinery Manager sold by Fisher-Rosemount Systems, Inc. analyzes and manages rotating machinery in addition to pumps, motors and other equipment within a process plant. These other applications are typically available to the maintenance persons and are used to monitor and maintain the devices within a process plant.

Given that a typical process plant may easily includes hundreds and thousands of interconnected assets, some assets are more critical to a process within the plant or to the plant itself. For example, a strategically utilized valve or transmitter may affect the operation of an entire process within the process plant as much as, or more than, a particular rotating equipment. Criticality evaluation services, such as failure defense planning provided by CSi Systems of Knoxville, Tenn., have been provided to evaluate the various assets within a plant and determining their effect on other operations in the plant. The resulting evaluations provide information regarding the criticality of each asset within a plant. In particular, a maintenance priority index is provided to quantify the criticality of the asset to the loop, sub-unit, unit, area, or plant to which it belongs. Such information is particularly useful in planning plant operations, such as procedures for dealing with the failure of particular assets.

Also in a typical process plant, maintenance systems and applications are provided, such as Computer Maintenance Management systems, work/parts order generation routines and other maintenance applications, which may be used to generate work and part orders in response to a detected problem with a plant asset. The orders may be tracked to monitor the performance and completion of maintenance activities. Such maintenance systems and applications further include data regarding the assets within the plant, including procedures for maintaining and repairing the assets.

However, in the typical plant or process, the functions associated with the process control activities, the device and equipment maintenance activities, the monitoring activities, the criticality evaluations and the business activities are separated, both in the location in which these activities take place and in the personnel who typically perform these activities. Furthermore, the different people involved in these different functions generally use different tools, such as different applications run on different computers to perform the different functions.

Due to the abundance of data analysis and other detection and diagnostic tools available in the process control environment, either in the plant itself or via outside service companies or consultants, there is a lot of maintenance information which could be helpful to process operators and business persons. Similarly, there is a lot of information available to the process operator about the current operational status of the process control loops and other routines which may be helpful to the maintenance person or to the business person. Further, criticality information may be helpful to all persons within a plant. For example, the maintenance person may find information relating to the importance of each asset particularly useful in generating, directing and prioritizing work orders and part orders. However, in the past, because these functions were separated, status information; criticality information and information regarding corrective measures were generated or collected in one functional area was not used at all, or not used very well in other functional areas which led to an overall sub-optimal use of the assets within process plants.

SUMMARY

A process control system includes a data collection and distribution system that collects and stores data from different data sources, each of which may use it own proprietary manner of acquiring or generating the data in the first place. The data collection and distribution system then makes the stored data available to other applications associated with or provided in the process control system or to applications associated with the data sources themselves for use in any desired manner. In this manner, applications may use data from vastly different data sources to provide a better view or insight into the current operational status of a plant, to make better or more complete maintenance decisions regarding the plant, etc. Thus, applications may be provided which combine or use data from previously disparate collection systems such as status information, criticality information, and corrective measures to determine a better overall view or state of a process control plant, or to take better corrective measures within the plant. For example, information or data may be collected pertaining to the status of various equipment or other entities within a plant. Likewise, criticality information pertaining to the importance of the equipment or entity may be collected, and information pertaining to the status of a corrective measure associated with the equipment or entity may be collected.

Using the disclosed data collection and distribution system, status data and criticality data may be combined, for example, to perform improved functions within a plant, including monitoring functions, diagnostic functions, maintenance functions, decisions, analyses, control, and optimization. Further, using the disclosed data collection and distribution system, status data and corrective measure status data may be combined perform improved corrective measures within a plant. Still further, the status data and corrective measure data may be combined with criticality data to perform improved corrective measures within the plant. Likewise, the detection of a problem, may cause the system and method to automatically generate or modify replacement parts, work orders or other corrective measures. There are, of course, many other types of applications to which the combination of status, criticality and/or corrective measure data can be an aid by providing different and more complete information about the status of the assets within a process control plant to all areas of the process plant.

BRIEF DESCRIPTION OF THE DRAWINGS

FIG. 3 is an exemplary graphical display that may be provided by a graphical user interface to enable a user to view status information, criticality information and corrective measure information of high priority assets;

Figure 4:
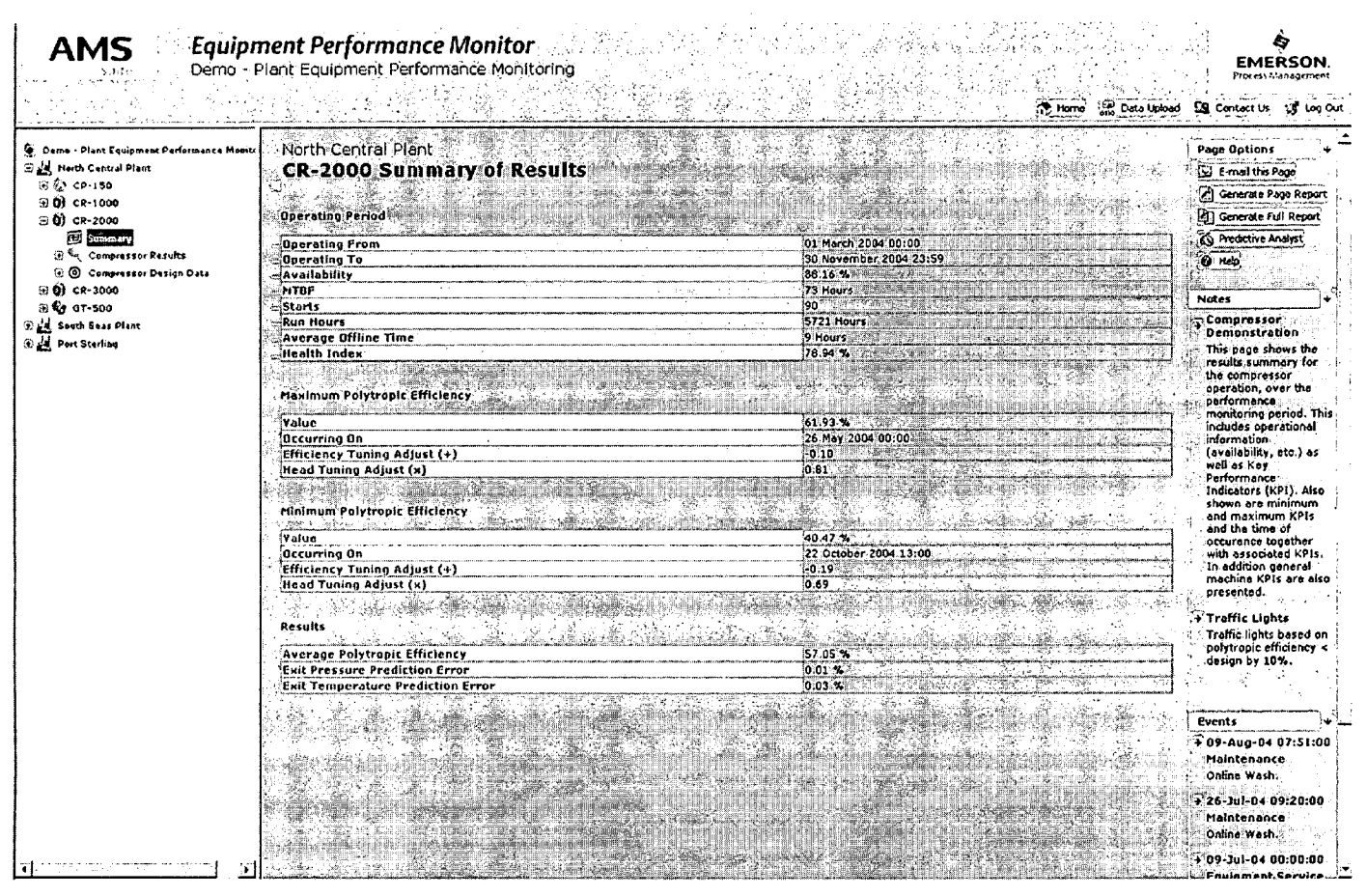

FIGS. 4-7 are exemplary graphical displays that may be provided by a graphical user interface to enable a user to view status information, criticality information and corrective measure information of a lower level entity;

FIG. 8 is an exemplary graphical display that may be provided by a graphical user interface to enable a user to view status information of a higher level entity;

FIG. 10 is an exemplary graphical display that may be provided by a graphical user interface to enable a user to view status information, criticality information and corrective measure information of lower level entities within a higher level entity;

DETAILED DESCRIPTION

Figure 1:
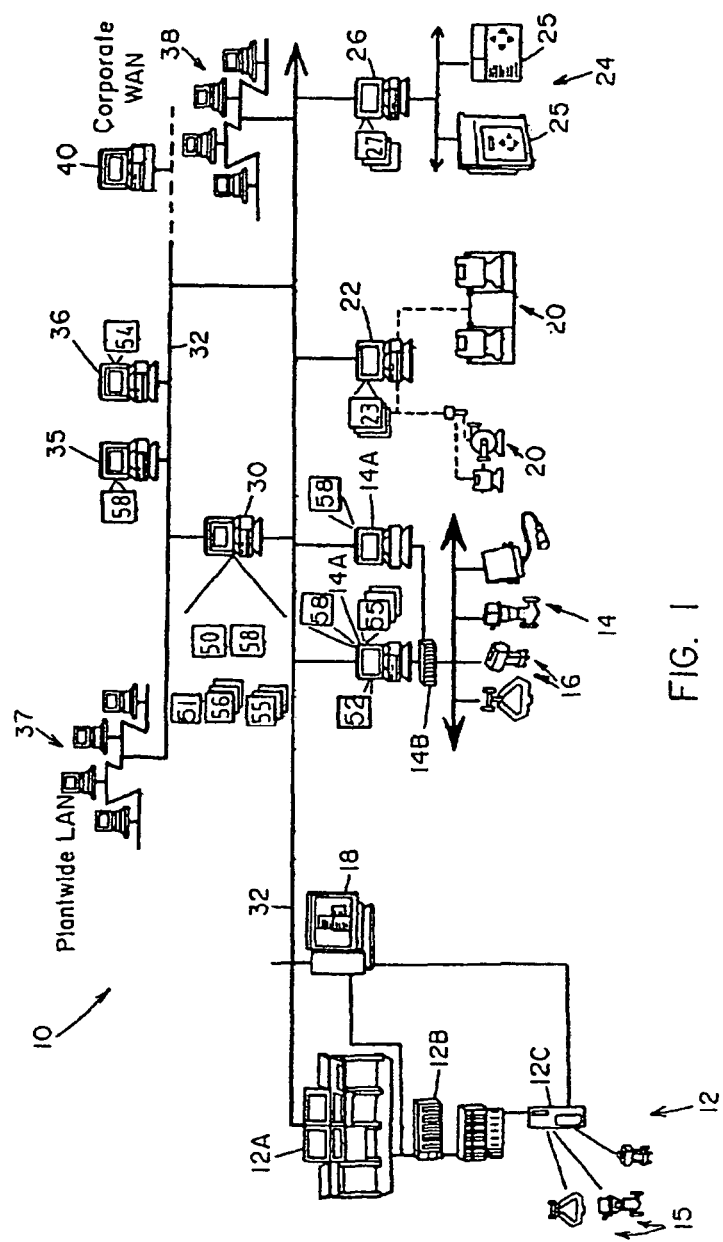
FIG. 1 is a schematic diagram of a process plant displaying an example of a hierarchical structure of equipment and instructions implemented in a process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application, such as AMS Device Manager sold by Fisher-Rosemount Systems, Inc., or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSi Systems of Knoxville, Tenn., AMS Machinery Manager sold by Fisher-Rosemount Systems, Inc. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. Alternatively, or in addition, the computer system 30 process control system 12, distributed process control system 14, maintenance interface 18, process control and/or maintenance interfaces 14A, rotating equipment maintenance computer 22, and/or the power generation and distribution computer 26 may be interconnected via an internet and communicate via an internet-compatible protocol. Accordingly; the plant 10 may be provided with viewing and control functions via one or more remote facilities which to view and control the various systems, computers and routines within the plant 10.

In addition, remote monitoring facilities may be communicatively coupled to the plant 10 via the internet to provide access to additional analysis and diagnostics resources. In one example, the plant 10 may be coupled to a failure defense planning system, which includes an analysis of the various plant assets and prioritizes the assets according to their importance to the plant or to systems within the plant to provide criticality data.

As illustrated in FIG. 1, the computer 30 is also connected via the same or a different network bus 32 to business system computers and maintenance planning computers 35 and 36, which may execute, for example, enterprise resource planning (ERP), material resource planning (MRP), computer maintenance management systems (CMMS) including work order generation and tracking tools such as SAP and Maximo both sold by Fisher-Rosemount Systems, Inc., accounting, production and customer ordering systems, maintenance planning systems or any other desired business applications such as parts, supplies and raw materials ordering applications, production scheduling applications, etc. An example of a work order and parts order generation and tracking tool is disclosed in U.S. patent application Ser. No. 10/086,159 entitled "Automatic Work Order/Parts Order Generation and Tracking" which was filed on Feb. 28, 2002 and is expressly incorporated by reference herein. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML/XSL protocol. Here, data from each of the computers 12A, 18, 14A, 22, 26, 35, 36, etc. is wrapped in an XML/XSL wrapper and is sent to an XML/XSL data server which may be located in, for example, the computer 30. Because XML/XSL is a descriptive language, the server can process any type of data. At the server, if necessary, the data is encapsulated with a new XML/XSL wrapper, i.e., this data is mapped from one XML/XSL schema to one or more other XML/XSL schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. An example of an asset utilization expert is disclosed in U.S. Pat. No. 6,813,532 to Eryurek et al., (issued Nov. 2, 2004), which is hereby expressly incorporated by reference herein.

The asset utilization expert 50 operates as a data and information clearinghouse in the process plant 10 and is able to coordinate the distribution of data or information from one functional area, such as the maintenance-area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process plant 10.

In particular, the asset utilization expert 50 may include or execute index generation software 51 that creates indices associated with devices, like process control and instrumentation devices, power generation devices, rotating equipment, units, areas, etc, or that are associated with process control entities, like loops, etc. within the plant 10. These indices can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

In one embodiment, the control expert 52 may be, for example, the control expert described in U.S. Pat. No. 6,298,454 to Schleiss et al. (issued Oct. 2, 2001) and U.S. Pat. No. 6,633,782 to Schleiss et al. (issued Oct. 14, 2003), both of which are hereby expressly incorporated by reference herein. However, these control experts may additionally incorporate and use data related to the status of devices or other hardware within the process plant 10 in the decision making performed by these control experts. In particular, in the past the software control experts generally only used process variable data and some limited device status data to make decisions or recommendations to the process operator. With the communication provided by the asset utilization expert 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization expert 50 can provide information pertaining to states of devices and the operation of the control activities within the plant 10 to the business systems 35 and 36 where, for example, a work order generation application or program 54, such as a Computer Maintenance Management system, can automatically generate work orders and order parts based on detected problems within the plant 10 or where supplies can be ordered based on work being performed. Similarly, changes in the control system detected by the asset utilization expert 50 may cause the business systems 35 or 36 to run applications that perform scheduling and supply orders using, for example, the program 54. In the same manner, changes in customer orders etc. can be entered into the business systems 35 or 36 and this data can be sent to the asset utilization expert 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset utilization expert 50.

Additionally, the asset utilization expert 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefore could be sent by the asset utilization expert 50. An example of an asset optimizer is the AMS optimizer sold by Fisher-Rosemount Systems, Inc. If desired, the plant 10 may also include models 56 that model certain aspects of the plant 10 and these models 56 can be executed by the asset utilization expert 50 or a control or other expert such as the control expert 52 to perform modeling functions, the purpose of which will be described in more detail herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those created by and sold by MDC Technology located in Teeside, England or may be any other desired types of models. There are, of course, many other applications that can be provided within the plant 10 and that can use the data from the asset utilization expert 50 and the system described herein is not limited- to the applications specifically mentioned herein. Overall, however, the asset utilization expert 50 helps to optimize the use of all of the assets within the plant 10 by enabling the sharing of data and coordination of assets between all of the functional areas of the plant 10.

The asset utilization expert 50 receives data as it is generated or at certain periodic times over, for example, the bus 32 or other any communication network within the process plant 10. Thereafter, periodically or as needed, the asset utilization expert 50 redistributes the data to other applications or uses that data to generate and provide other information useful in different aspects of the control or operation of the process plant 10 to other function systems within the plant 10. In particular, the asset utilization expert 50 may supply data to cause the index generation routine 51 to create a series of composite indices such as a performance index, a utilization index, a health index and a variability index associated with one or more of the devices, units, loops, areas, or other entities within the process plant 10. The indices will be discussed in more detail herein.

The use of models provides many new types of data or information for the business applications, process-control applications and asset maintenance and monitoring applications. In particular, the models can be used to perform performance monitoring and to produce a performance index which indicates the relative performance of a device, unit, area, etc. within a plant. This performance index may be a measure of the performance of an entity with respect to the possible performance of that entity. While device and unit models may be made and executed, similar models could be made and executed for process control entities, such as loops, units, etc. to provide performance measures and optimization criteria for these types of entities as well. Also, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indices, the asset utilization expert 50 can assist the index generation routine 51 in creating other types of indices such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization expert 50 and provided to the index generation routine 51 at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine 51.

The utilization index, in one form or another, tracks or reflects the utilization of individual devices, units, loops, or other entities and may provide some indication as to whether these entities are being over utilized or under utilized based on previously determined bench marks or operational goals. A utilization index can be generated based on measured uses of the actual device. For example, a device may be measured as to how often it is being used within a process or is being left idle and this index may be compared to a desired utilization for that entity to determine if the entity is being over or under utilized. The utilization index might identify devices, units, loops, etc. which are not being utilized as often as they could be or should be or, on the other hand, which are being utilized too much and, thus, are being over used. In some instances, a utilization index might be determined based on the business decisions made regarding the appropriate or desired use of a particular device.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization expert 50, AMS applications, maintenance computers 18, 20, business computers 35, 36, failure defense planning evaluations, etc. and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to obtain information about the states of devices, control loops, units, etc., such as status and criticality, and to easily see the information related to the problems with these entities, as that information has been detected by other software within the process plant 10. In addition, the control guidance tool allows the operator or any other person to view the status of and modify maintenance procedures related to solving detected or predicted problems with the plant assets, including maintenance procedures and corrective measures provided by the CMMS such as work orders, part orders or other corrective measures.

The user interface routine 58 may also provide performance monitoring screens using performance monitoring data provided by or generated by the tools 23 and 27, the maintenance programs such as the AMS application or any other maintenance programs, or as generated by the models in conjunction with the asset utilization expert 50. Of course, the user interface routine 58 may provide any user access to and enable the user to change preferences or other variables used in any or all functional areas of the plant 10.

Figure 2:
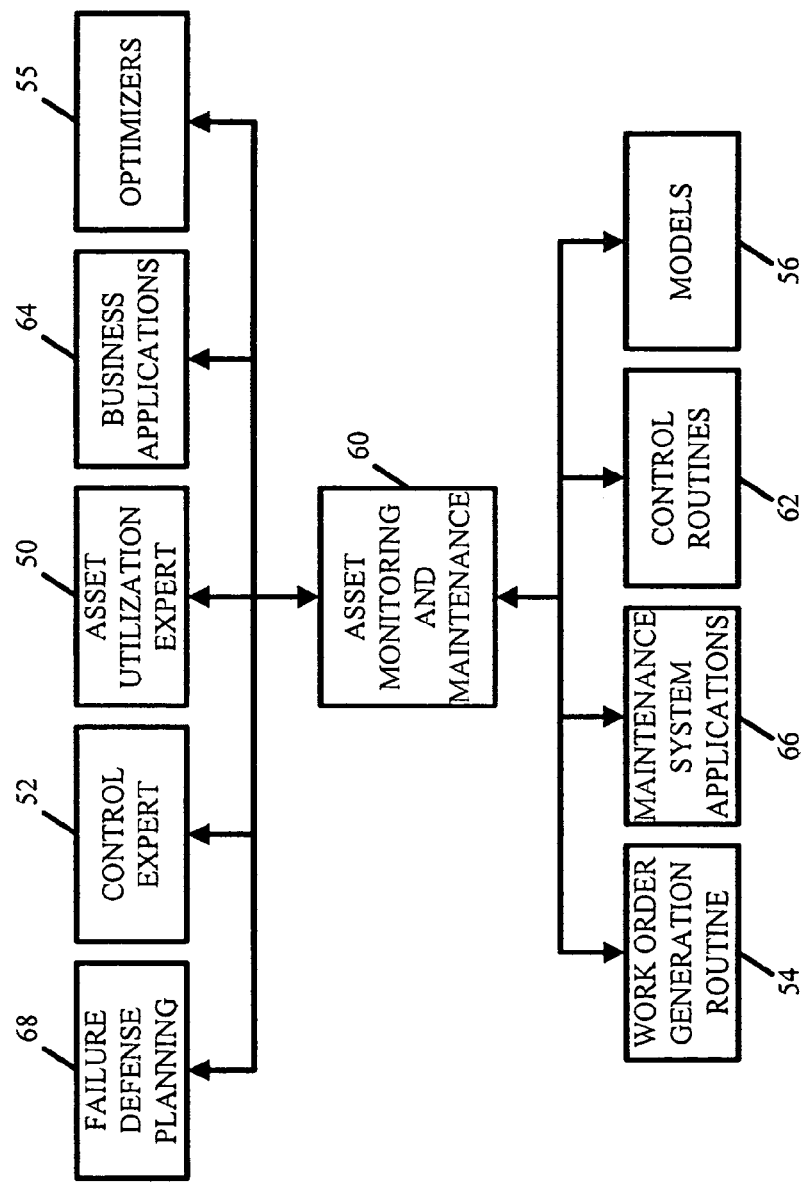
FIG. 2 is a data and information flow diagram with respect to an asset monitoring and maintenance system within the plant of FIG. 1.
Figure 5:
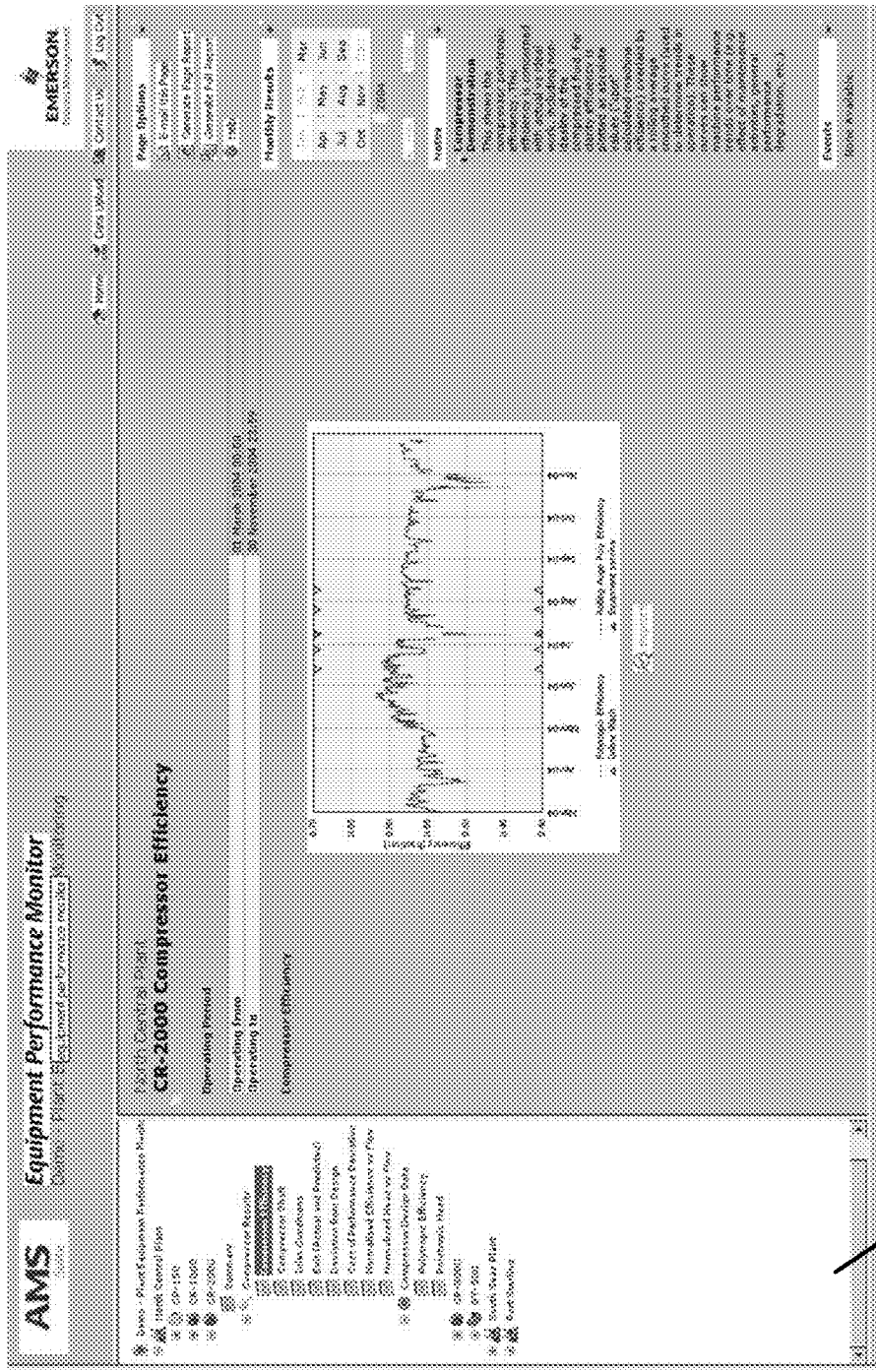
Figure 6:
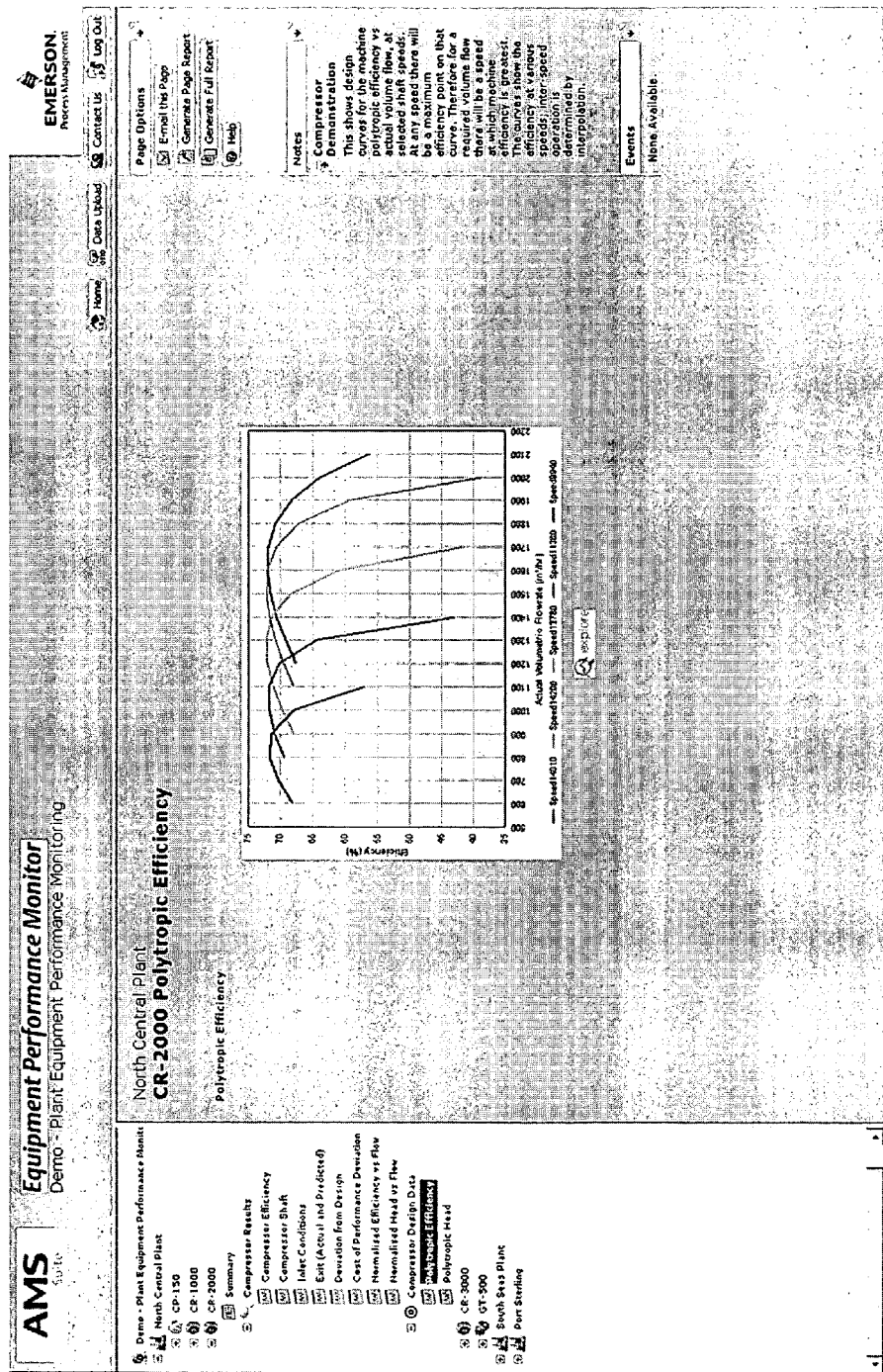

Referring now to FIG. 2, a data flow diagram illustrating some of the data flow between an asset monitoring and maintenance system 60 and other data tools or data sources is provided. In particular, the asset monitoring and maintenance system 60 may receive monitoring information from numerous data collectors or data sources such as multiplexers, transmitters, sensors, hand held devices, control systems, radio frequency (RF) transceivers, on-line control systems, on-line monitoring systems, web servers, historians, control modules or other control-applications within the process plant 10, interfaces such as user interfaces and I/O interfaces as well as data servers such as buses (e.g., Fieldbus, HART and Ethernet buses), valves, transceivers, sensors, servers and controllers and other plant assets such as process instrumentation, rotating equipment, electrical equipment, power generation equipment, variable speed drivers, etc. This data can take on any desired form based on how the data is generated or used by other functional systems. Still further, this data may be sent to the asset monitoring and maintenance system 60 using any desired or appropriate data communication protocol and communication hardware such as the XML protocol discussed above. Generally speaking, however, the plant 10 will be configured so that the asset monitoring and maintenance system 60 automatically receives specific kinds of data from one or more of the data sources.

Also, the asset monitoring and maintenance system 60 receives information from data analysis tools such as typical maintenance data analysis tools which are currently provided today, performance tracking tools, such as those associated with devices, as well as performance tracking tools for process control systems like that described in U.S. Pat. Nos. 6,298,454 and 6,633,782 identified above. The data analysis tools may also include, for example, a root cause application which detects root causes of certain types of problems, event detection such as that described in U.S. Pat. No. 6,017,143, regulatory loop diagnostics such as that disclosed in U.S. Pat. No. 6,387,114 to Eryurek et al. (issued May 28, 2002), which is hereby expressly incorporated by reference herein, impulse lines plugging detection applications, such as that described in U.S. Pat. No. 6,654,697 to Eryurek et al. (issued Nov. 25, 2003), which is hereby expressly incorporated by reference herein, other plugged line detection applications, device status applications, online monitoring devices, device configuration applications, device storage, historian and information display tools, online monitoring tools such as AMS Device Manager and AMS Machinery Manager, and Explorer applications and audit trail applications. Monitoring data and analysis data may further be received from the asset utilization expert 50, including the use indices described above.

Further, the asset monitoring and maintenance system 60 can receive maintenance data related to maintenance activities within the process plant 10 from maintenance applications 66, including CMMS and other work order generation routines 54. For example, the asset monitoring and maintenance system 60 may receive data relating to work orders and part orders generated by the maintenance applications 66, including details regarding the orders such as the request for the order, the status of the order, the personnel involved, the parts involved, the maintenance procedures for the asset, the time and date the order was generated, etc. Additional information received by the asset monitoring and maintenance system 60 can include details regarding the problem or predicted problem with the asset and the alert or alarm that prompted the order.

Still further, the asset monitoring and maintenance system 60 can receive data and any information from process control data analysis tools such as the advanced control expert 52, model predictive control process routines such as those described in U.S. Pat. No. 6,721,609 to Wojsznis et al. (issued Apr. 13, 2004), which is hereby expressly incorporated by reference herein, and U.S. Pat. No. 6,445,963 to Blevins et al. (Issued Sep. 3, 2002), which is hereby expressly incorporated by reference herein, tuning, routines, fuzzy logic control routines and neural network control routines, as well as from virtual sensors such as that described in U.S. Pat. No. 5,680,409 to Qin et al., which is expressly incorporated by reference herein and which may be provided within the plant 10.

Still further, the asset monitoring and maintenance system 60 may receive information from data analysis tools related to rotating equipment such as on-line vibration, RF wireless sensors and hand-held data collection units, oil analysis associated with rotating equipment, thermography, ultra-sonic systems and laser alignment and balancing systems, all of which may be related to detecting problems or the status of rotating equipment within the process plant 10. These tools are currently known in the art and so will not be described further herein.

Still further, the set monitoring and maintenance system 60 may receive data related to power management and power equipment and supplies such as the applications 23 and 27 of FIG. 1, which may include any desired power management and power equipment monitoring and analysis tools. Additional data sources from which the asset monitoring and maintenance system 60 may receive data include control routines 62 which may be located in process controllers or interfaces associated with those controllers and which may provide process control data in addition to that provided above, optimizers 55 which may provide optimization data, models 56 which may provide the indices described above and process performance data, business applications 64, etc.

In addition, the asset monitoring and maintenance system 60 may receive criticality data from failure defense planning evaluations 68 which may be provided via a database within the plant 10 or as a remote service. Generally, the failure defense planning evaluations are typically structured in a hierarchical manner where assets are composed of other assets. For example, various equipment or devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. This organization allows users to view and manage the plant 10 and maintenance activities of the systems and assets within the plant 10. The corresponding criticality data relates to the importance of the assets within the plant 10 and may be useful when viewing status information and making maintenance decisions.

The criticality data may be provided as a result of on-site evaluations by service personnel, such as the failure defense planning services provided by CSi Systems of Knoxville, Tenn., which includes evaluating the various assets within a plant and determining their effect on other operations in the plant, including, but not limited to, process control operations, business functions and maintenance functions. For example, some equipment (e.g., a strategically placed valve) is considered more critical to the larger loop, sub-unit, unit, area, plant, etc. of which the equipment is a part. If the equipment were to fail it would have more of an impact on the loop, sub-unit, unit, area, etc. than if the other equipment (e.g., rotating equipment) were to fail. Such equipment would therefore deserve priority over the other equipment. In turn, the remaining equipment may have varying degrees of importance within the loop, sub-unit, unit or area. The on-site evaluations conclude that such equipment has a greater impact and therefore has greater importance within the plant. The criticality data for the equipment reflects the fact that it has a greater importance than other equipment, and may be expressed as a quantitative interpretation such as a maintenance priority index.

In one example, the asset monitoring and maintenance system 60 uses data received from the above data sources to oversee the status of various assets within the plant 10 or business entity, at various levels of hierarchy. In particular, by collecting asset status information and criticality data from disparate sources to a common source, the asset monitoring and maintenance system 60 allows a variety of users to view status information of equipment in conjunction with the criticality data to provide an improved understanding of the importance of the equipment to the loop, sub-unit, unit, area, plant, etc. Because the asset monitoring and maintenance system 60 allows the user to view the assets at various levels of hierarchy, a user may further view the status of a loop in conjunction with its importance, view the status of a sub-unit in conjunction with its importance, etc. The user is thereby able to make more informed decisions in response to the status of various assets.

Still further, the asset monitoring and maintenance system 60 may provide data to enterprise resource planning tools such as those typically used in business solutions or business computers 35 and 36. These applications may include production planning tools which control production planning, material resource planning, the work order generation tool 54 which automatically generates part orders, work orders, or supply orders for use in the business applications, etc. Of course, the part order, work order and supply order generation may be completed automatically by the asset monitoring and maintenance system 60 as described further below, which decreases the time required to recognize that an asset needs to be fixed as well as the time is takes to receive the parts necessary to provide corrective action with respect to maintenance issues.

The asset monitoring and maintenance system 60 may also provide information to the maintenance system applications 66, which not only alert maintenance people to problems immediately, but also take corrective measures such as ordering work, parts, etc. which will be needed to correct a problem. Still further, new models 56 may be generated using types of information that are available to the asset monitoring and maintenance system 60 but that were previously unavailable to any single system. Of course, it will be understood from FIG. 2 that the asset monitoring and maintenance system 60 not only receives information or data from the data models and the analysis tools but, also receives information from and provides information to enterprise resource tools, maintenance tools and process control tools. For example, the asset monitoring and maintenance system 60 may provide data back to the controls expert 52, the asset utilization expert 50, business applications 64, optimizers 55, maintenance systems 66, control routines 62, models 56 and other systems and applications within the plant 10 to perform improved diagnostics and analysis, optimization, maintenance decisions, business decisions, process control decisions, etc. for any level of hierarchy within the process plant 10. For example, the asset utilization expert 50, optimizers 55, control expert 52, control routines 62 and process control operators may make improved decisions regarding optimization within the plant 10 through a better understanding of the status of plant assets in relation to their importance. Likewise, maintenance systems 66, work order generation routines 54 and maintenance personnel may make improved maintenance decisions, such as the order in which assets are repaired or maintained, the generation and expediency of work orders or part orders, etc. Business applications 64 and business personnel may use the data from the asset monitoring and maintenance system 60 to make improved business decisions regarding production, supply orders, etc.

In addition, the asset monitoring and maintenance system 60 oversees (and may actually execute) corrective measures within the plant 10, including corrective measures provided by CMMS, the work order generation routine 54, maintenance system applications 66, and the like. As mentioned above, maintenance personnel may make improved decisions regarding which asset to repair, including prioritization of work orders and part orders for repairing a problem with an asset. In addition, maintenance personnel or other users may view the status of work orders and part orders generated by the CMMS, work order generation routine 54, maintenance system applications 66, etc. and make decisions based on the status of such orders. Based on the criticality of an asset, a work or part order that has been generated but not yet executed may be given a new priority, such as expediting an order for a critical asset having a poor status, or otherwise rescheduling orders based on the importance of the corresponding assets. Further, the specifics of an order may be modified by the user based on the status and importance of an asset including ordering additional or different parts, additional work, modification of the frequency of maintenance activities, assign additional or different maintenance personnel to the repair of an asset, etc. Accordingly, a user may not only track maintenance activities within the plant 10, but may better optimize the maintenance activities within the plant 10 and direct maintenance activities based not only on the status of the assets, but also based on the importance of the asset to the loop, sub-unit, unit, area or plant.

In one example, the asset monitoring and maintenance system 60 may include an expert engine which may include a set of rules that utilize the status data, maintenance data and/or the criticality data to perform the above activities, including monitoring existing orders or other maintenance activities, modifying existing maintenance activities, initiating new maintenance activities, re-prioritizing maintenance activities, etc. In one example, expert engine of the asset monitoring and maintenance system 60 may be similar to the work order generation routine 54. As a result, a critical asset having a poor status indicator may automatically result in an analysis of the problem to determine the cause and generate a solution. The solution may be based on maintenance procedures previously developed by and received from the CMMS or other maintenance application 66. Accordingly, the asset monitoring and maintenance system 60 may automatically generate an appropriate work order and/or part order directed to the specifics of the problem, including assigning particular maintenance personnel to the problem, ordering particular parts to solve the problem, etc. and communicating the order to the appropriate personnel, part supplier, etc. Alternatively, a work order or part order previously generated by the CMMS or work order generation routine 54 may be automatically modified by the asset monitoring and maintenance system 60 to provide a more optimal response to problems within the plant 10 and better utilize maintenance resources.

Moreover, one or more coordinated user interface routines 58 may communicate with the asset monitoring and maintenance system 60 as well as any other applications within the plant 10 to provide help and visualization to operators, maintenance persons, business persons, etc. The operators, and other users may use the coordinated user interface routines 58 to perform or to implement predictive control, change settings of the plant 10, view help within the plant 10, or perform any other activities related to the information provided by the asset monitoring and maintenance system 60. As discussed above, the user interface routines 58 may include an operator guidance tool that receives information from the asset monitoring and maintenance system 60, which can be used by an operator or other user to help perform many functions such as viewing the status of a process or devices within the process, to view the status of a corrective measure, initiate new corrective measure, modify an existing corrective measure, etc. Still further, the user interface routines 58 may be used to view data or to obtain data from any of the tools in the other parts of the process plant 10 via, for example, the asset utilization expert 50 and the failure defense planning evaluations 68. For example, managers may want to know what is happening in the processor may need high level information related to the process plant 10 to make strategic plans.

The user interface routines 58 provides a graphical user interface (GUI) that is integrated with the asset monitoring and maintenance system 60 described herein to facilitate a user's interaction with the various monitoring and maintenance capabilities provided by the asset monitoring and maintenance system 60. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset monitoring and maintenance system 60. For example, the user interface routine 58 and GUI may be incorporated as part of a web-based software routine that permits a user to view status, criticality and maintenance data via a network connection, such as over the Plantwide LAN 37, the Internet, or other communications system, thereby allowing a user to the status and criticality, and any associated corrective measures, on a device, loop, unit, area, etc. remotely from where that device, loop, unit, area, etc. is located or even remotely from the process plant 10. For example, reports, or summaries thereof, may be sent to phones, pagers, electronic mail, etc. This may be particularly useful if the report is time critical (e.g., a device failure alert). An example of a method and system that could permit a user to view data via a communications system to a pager, cellular phone, personal digital assistant, email address, laptop computer, desktop computer, or any other type of device or hardware platform may be found in U.S. patent application Ser. No. 10/123,445 entitled "Web Services-Based Communications For Use With Process Control Systems," which was filed on Apr. 15, 2002, and which is expressly incorporated herein by reference.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the asset monitoring and maintenance system 60 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset monitoring and maintenance system 60.

Generally speaking, the GUI described herein provides intuitive graphical depictions or displays of business entities, process plants 10, process control areas, units, loops, devices, etc. Each of these graphical displays may include numerical and/or descriptive status information and criticality information that is associated with a particular view being displayed by the GUI. For example, a display depicting a process control area may provide a set of indices reflecting the status of that area (i.e., a particular portion of the process control system at a particular level of the equipment hierarchy) and a maintenance priority index or other quantitative representation of the criticality of the area. On the other hand, a display depicting a device may provide a set of status indices and criticality index associated with that particular device. In any event, a user may use the status information and criticality information shown within any view, page or display to quickly assess whether a problem exists within any of the devices, loops, etc. depicted within that display and the assess the optimal response to the problem.

Additionally, the GUI described herein may automatically, or may in response to a request by a user, provide maintenance information to the user. The maintenance information may be provided by any portion of the asset monitoring and maintenance system 60. Similarly, the GUI may display alarm information, process control information, etc., which may also be provided via the asset monitoring and maintenance system 60. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

FIG. 3 is an exemplary depiction of a graphical display that may be provided by the GUI to provide status, criticality and corrective measure data to a user to quickly analyze assets within a business entity or plant 10 which have been determined to have a high priority for maintenance activities. As shown in FIG. 3, the GUI may graphically depict the assets with a high priority for maintenance activities. In particular, the GUI provides details 100 regarding the assets, including an alphanumeric identifier (e.g., CR-2000) that uniquely identifies that asset within the plant. Each asset may be displayed with a corresponding description of the asset, the type of asset, manufacturer and model may be provided within the display.

With each corresponding asset, the criticality of the asset is displayed as provided via the failure defense planning evaluations. As noted in FIG. 3, the criticality is provided as a quantitative numerical value 102, though it should be recognized that different representations of criticality may be utilized, such as alphanumeric representations, various colors or shadings representing different degrees of criticality, or any other manner of visual representation. Ideally, the representation is provided to enable a user to quickly ascertain the criticality of the asset.

Likewise, the status of each asset is displayed as a quantitative value 104 with corresponding colors and shadings to quickly ascertain the status of the devices. By way of example only, health index values for the high priority assets are displayed. However, different status information may be displayed for any of the assets as desired, examples of which have been provided throughout this disclosure. As can be appreciated from the display shown in FIG. 3, a user can quickly ascertain which assets within a plant 10 that need immediate attention, which may be causing a particular problem and/or which require expedited corrective measures. It should be noted that while not all assets have particularly poor health, the criticality value 102 may nonetheless dictate that the asset required maintenance in order to optimize the loop, sub-unit, unit, area or plant of which the asset is a part, because the degraded health, even if relatively minimal, may have a significant impact on the loop, sub-unit, unit, area, plant, etc.

A summary of additional status information 106 associated with the asset, including indications of various diagnostics or analysis that may have been performed with respect to the asset (e.g., oil analysis, ultrasonic analysis, vibration analysis, infrared thermography analysis, calibration, etc.) are displayed. The status or result of each analysis may be depicted by corresponding alphanumeric and/or color/shading indicators, though it should be recognized that various other graphical depictions may be utilized. As disclosed above, orders such as work and part orders may be generated by the CMMS or the work order generation routine 54. The status 108 of the order, if any, is displayed for each asset.

It will also be understood from viewing the GUI of FIG. 3 that a user may be provided with a plantwide view of the assets and view successively lower and lower entities within a plant and be provided status information about each of these different entities or views. Thus, for example, a user may look at a view of the plant and see status information for the plant. The user may then focus on one asset, such as by selecting one of the assets within the plant view, and see the status information associated with that asset whether it be a device, loop, sub-unit, unit, area, etc. A user may use a mouse to click on the asset, or the associated alphanumeric identifier or, alternatively, may enter the identifier via a keyboard, to request a new window or a pop-up window to display status information for that asset. For example, user may use a mouse to click on an area to display status information for that area. Similarly, by clicking on units within the displayed area, the status information for different units may be viewed. Likewise, status information for loops, sub units, devices etc. may then be viewed by focusing in on these different entities from a view of an entity in which these lower level entities are located. In this manner, a user can quickly find the cause of a problem or potential problem at any point or level of the plant, find maintenance activities at any level of the plant, identify high priority assets at any level of the plant, etc.

Each asset, status information, description, criticality information and corrective measures listed in the display may be arranged to allow a user to request further detailed information regarding that status information and/or entity. For example, the listed assets, status information, descriptions, criticality information and associated corrective measures may be user selectable icons, similar to a hyperlink in a web page, that link to another report featuring further detailed information associated with the selected entity or status information. In response to a user action or request (e.g., clicking on the link), the display of FIG. 3 may be replaced with the more detailed information, or alternatively, a new window may appear reporting on the further detailed status information regarding the selected asset or view. For example, a user may select one of the high priority assets to immediately view high priority problems within the plant 10, or the user may select a plantwide view (labeled "Dashboard"). Additional selections include an audit trail of events within the plant ("Event History"), all active alerts within the plant 10, a listing of all assets within the plant 10, and browse/search function for finding a specific asset.

FIGS. 4-8 are exemplary depictions of graphical displays that may be provided by the GUI to enable a user to view further information relating to a high priority asset (e.g., CR-2000) listed in the display of FIG. 3. Notably, the GUI enables a user to navigate among the various assets within the process plant 10 and view various status information, criticality information and maintenance information for the plant and any asset thereof to provide consolidated reporting for all assets within the process plant 10. As shown in FIGS. 4-8, a user is provided with a tree level view 200 of the various assets within the process plant 10. The tree level view 200 permits the user to easily navigate to view status, criticality and maintenance information regarding different assets within the process plant 10. In this particular example, the tree level view 200 is arranged according to the assets within the plant 10, Various plants within a business entity and various status information (e.g., compressor results) pertaining to the selected asset. However, the tree level view 200 may be arranged in any desired manner according to user preferences. Therefore, the tree level view 200 may be arranged according to the various levels within the process plant 10, the assets within the plant 10, data sources used to provided the information displayed by the GUI, or any other desired configuration.

Alongside the tree level view 200, is a representation of further details regarding the selected asset. For example, in FIG. 4 a summary of the compressor CR-2000 is shown with details regarding its operating period and efficiency during the operating period. As with the tree level view 200, the summary may be user-configurable to list various status information, criticality information or maintenance information relating to the selected asset. For example, the display of FIG. 4 allows a user to view a summary of the operating period and corresponding efficiency data during the operating period associated with the compressor CR-2000. In response to a user action or request, (e.g., clicking on the link), the display of FIG. 4 may be replaced with graphical representations of the efficiency (FIG. 5) or the polytropic efficiency (FIG. 6) of the compressor during the indicated reporting period.

Figure 7:
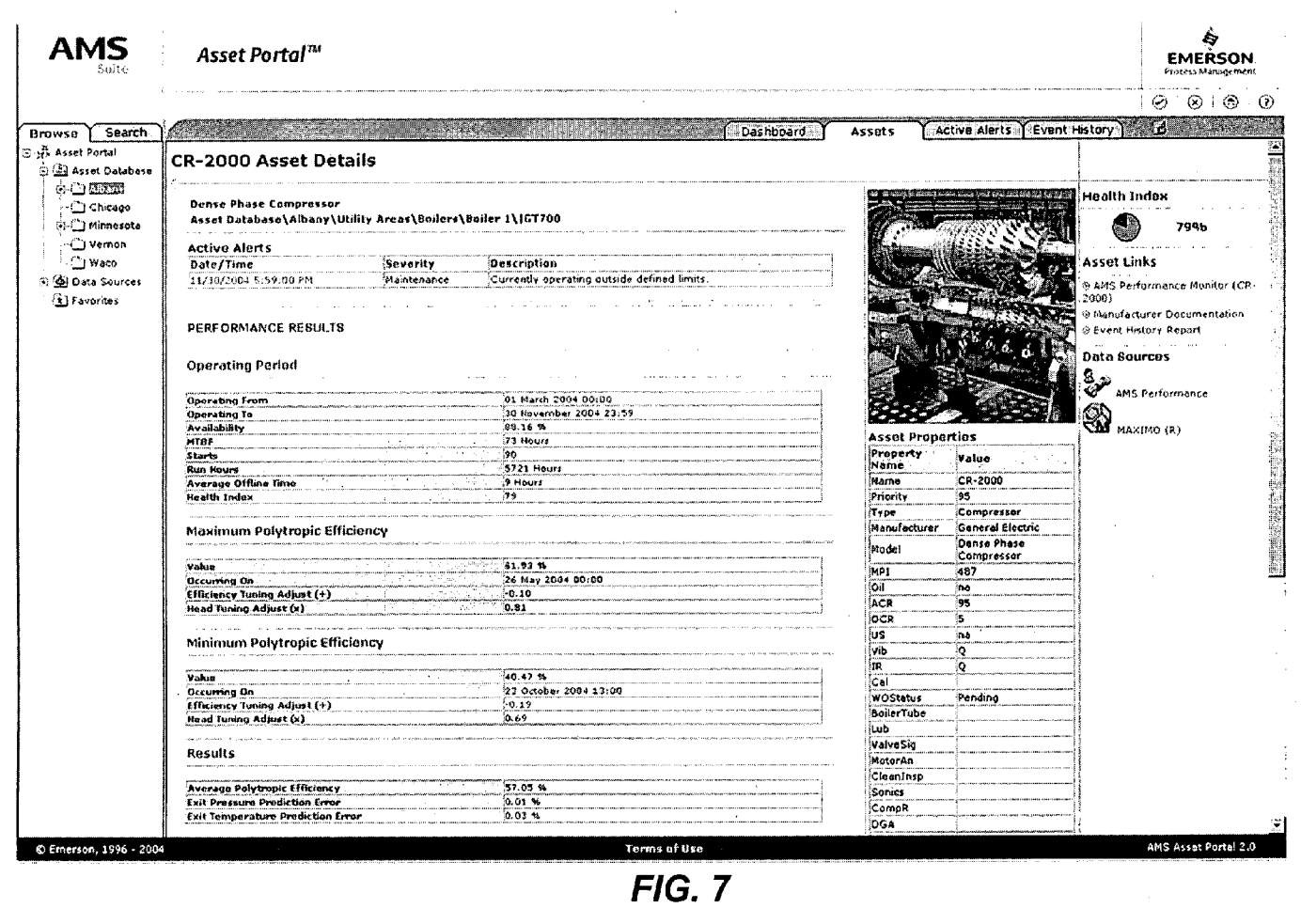

Each listed asset or status information may be user selectable to bring up even further detailed information regarding that asset, for example, by using dynamic links associated with each listed asset, data source, etc. In response to a user request (e.g. clicking on the alphanumeric identifier), status information regarding the details pertaining to compressor CR-2000 may be displayed in a summary as shown in FIG. 7. Any or all details regarding compressor CR-2000, including identification information (e.g., name, location, manufacturer, model), calibration status, analyses, operating period, efficiency, etc. may then be displayed in a separate window or in the same window. Further, a picture 210 of the physical device, or representation thereof, is provided to provide a clear visual representation of the asset at issue. The physical device is displayed alongside a graphical meter or gauge 212 (i.e., the pie graph) that enables a user to quickly determine the status (e.g., health) associated with the asset. Further, the criticality information, maintenance status and data sources are provided. It will be understood that the particular status information, criticality information or corrective measure information being displayed is not limited to any particular type, amount or level of detail. Instead, as described more fully below, the information that may be displayed can vary according to a user's need and/or preference.

Figure 8:
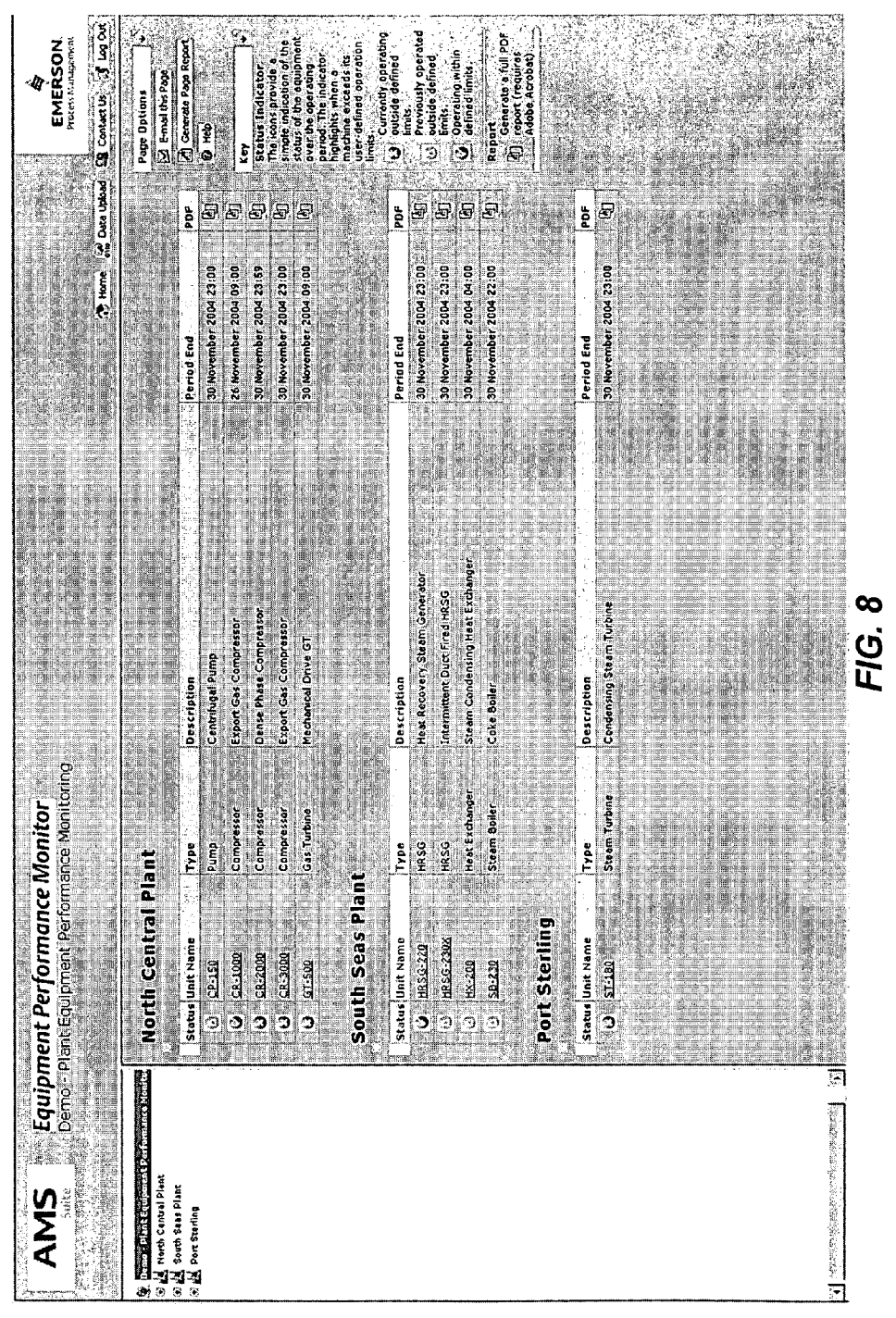

As shown in FIG. 8, a user may request, and the GUI may display, information summarizing the plants within a business enterprise by selecting the corresponding business enterprise view from the tree level view 200. Accordingly, a summary of each of the plants 10 may be displays, including corresponding operating periods, assets, asset details, etc.

FIGS. 9-17 are further exemplary depictions of graphical displays that may be provided by the GUI in response to a user request to view further status, criticality and maintenance information for different assets at various level of the process plant 10. For example, in response to a user request to display a plantwide view ("Dashboard") from the display of FIG. 3. Notably, a tree level view 300 is displayed and arranged according the various levels within the plant 10 and according to the various data sources. Accordingly, the menu 300 permits the user to easily navigate to view status information regarding different levels and entities within the plant 10, such as various devices, loops, units, areas, etc., including status information regarding the plant 10 itself. The menu 300 is further arranged according to the types of information that may be viewed, and may be arranged according to any other desired configuration.

Figure 9:
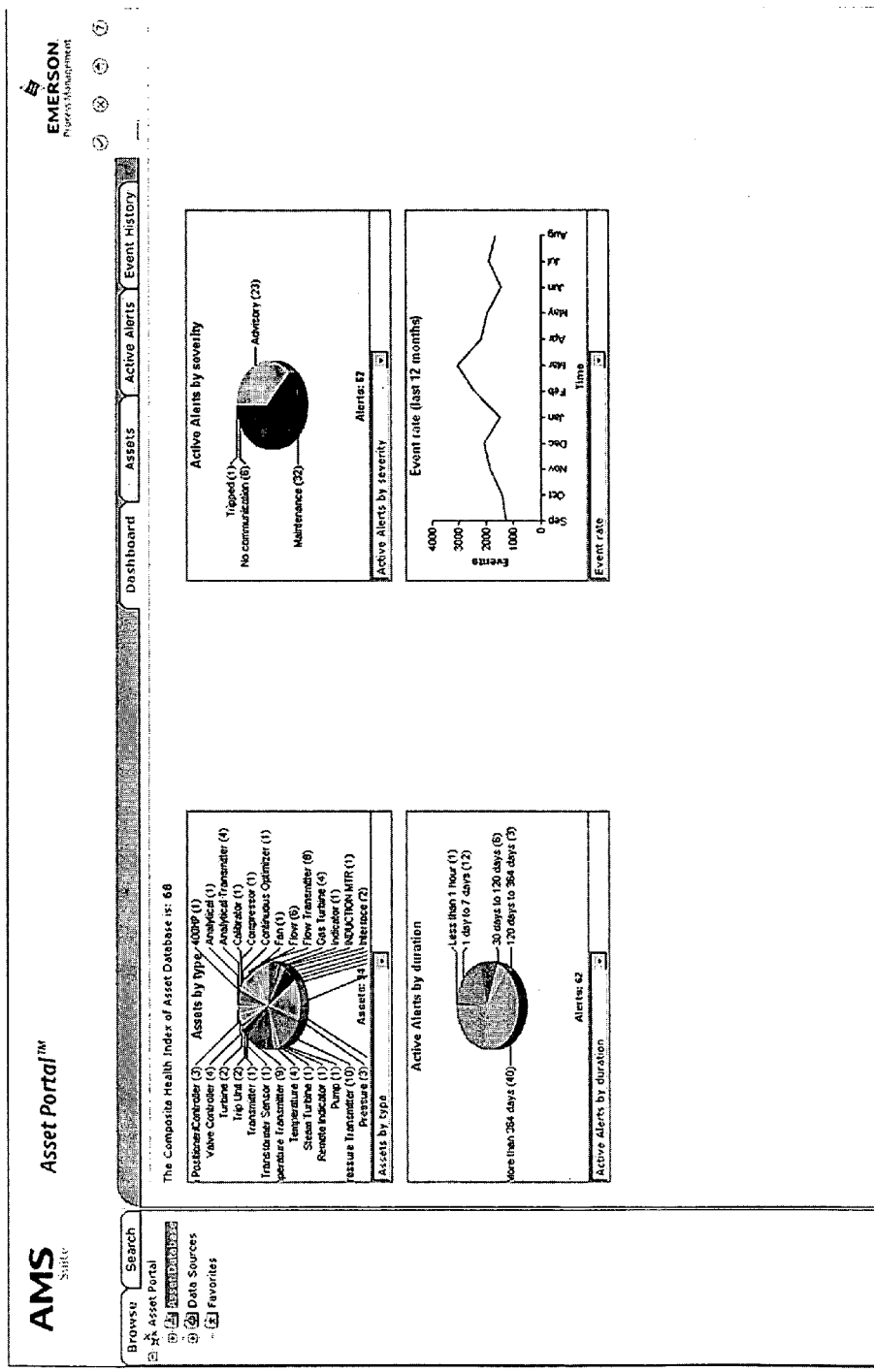
FIG. 9 is an exemplary graphical display that may be provided by a graphical user interface to enable a user to view status information of a higher level entity.

FIG. 9 is exemplary depiction of a display that may be provided by the GUI to enable a user to view a summary of the plant, 10, including a listing of the plant assets, active alerts, active alerts by severity, information regarding recent events, and an aggregate index in connection with the plant. Each of the displays, other than the index, is user configurable to select different views of plantwide alerts, assets, events, etc. A user may use a mouse to click on a given asset, event, alert, etc., to request a corresponding information. In this manner, a user can view additional detailed information about any aspect of the plant 10.

Figure 10:
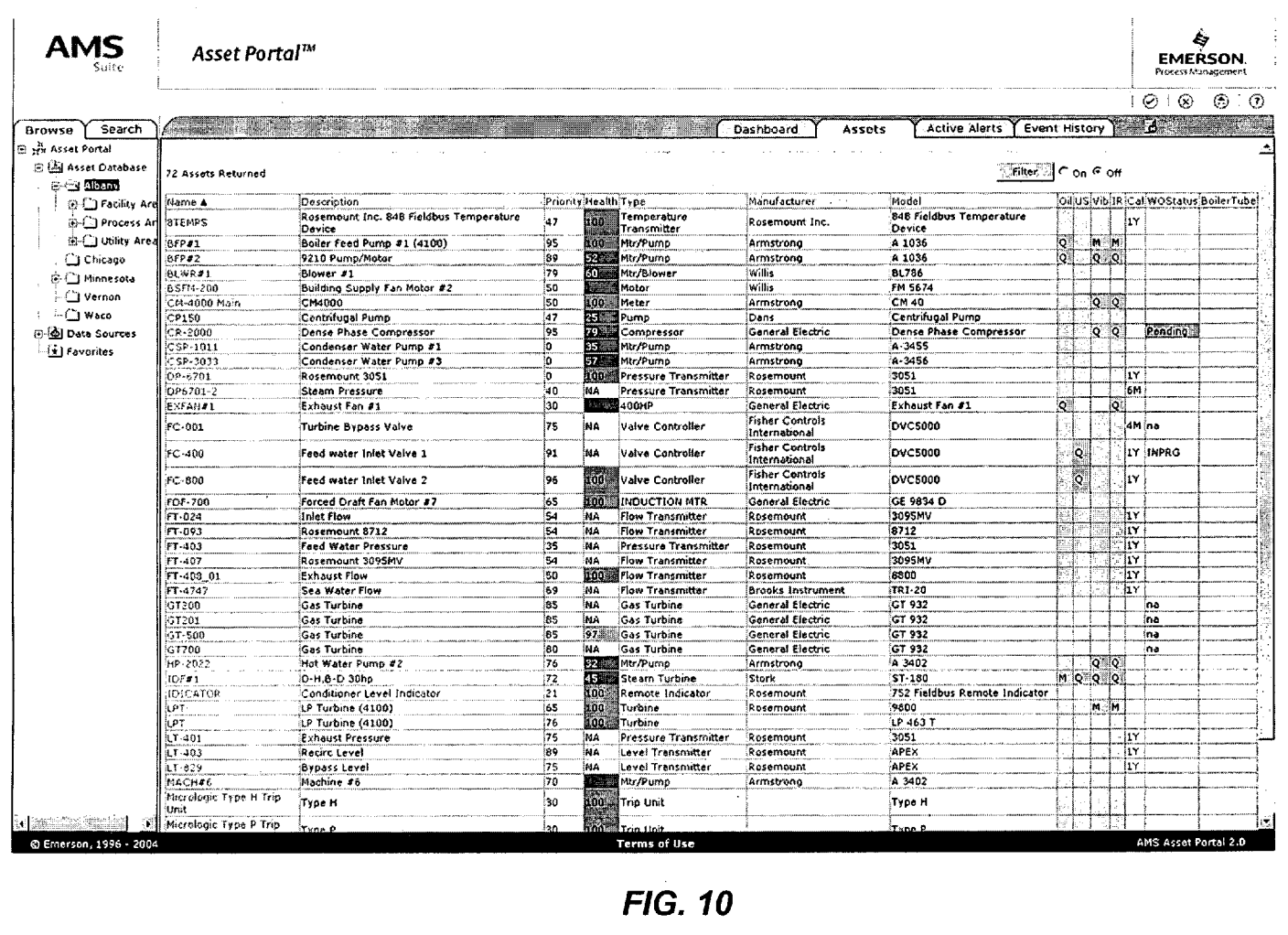

Above the listed status information for the plant are more user selectable icons responsive to user actions which bring up further detailed status information. These user selectable icons (or "tabs") reflect summary views of available information and are arranged along the top of the display to allow navigation among further available status information. For example, as shown in FIG. 10, a user may view all assets within the plant 10 by selecting the "Assets" tab. The resulting display includes a listing of all assets within the plant 10 along with the corresponding status information, criticality information and associated corrective measures.

Figure 11:
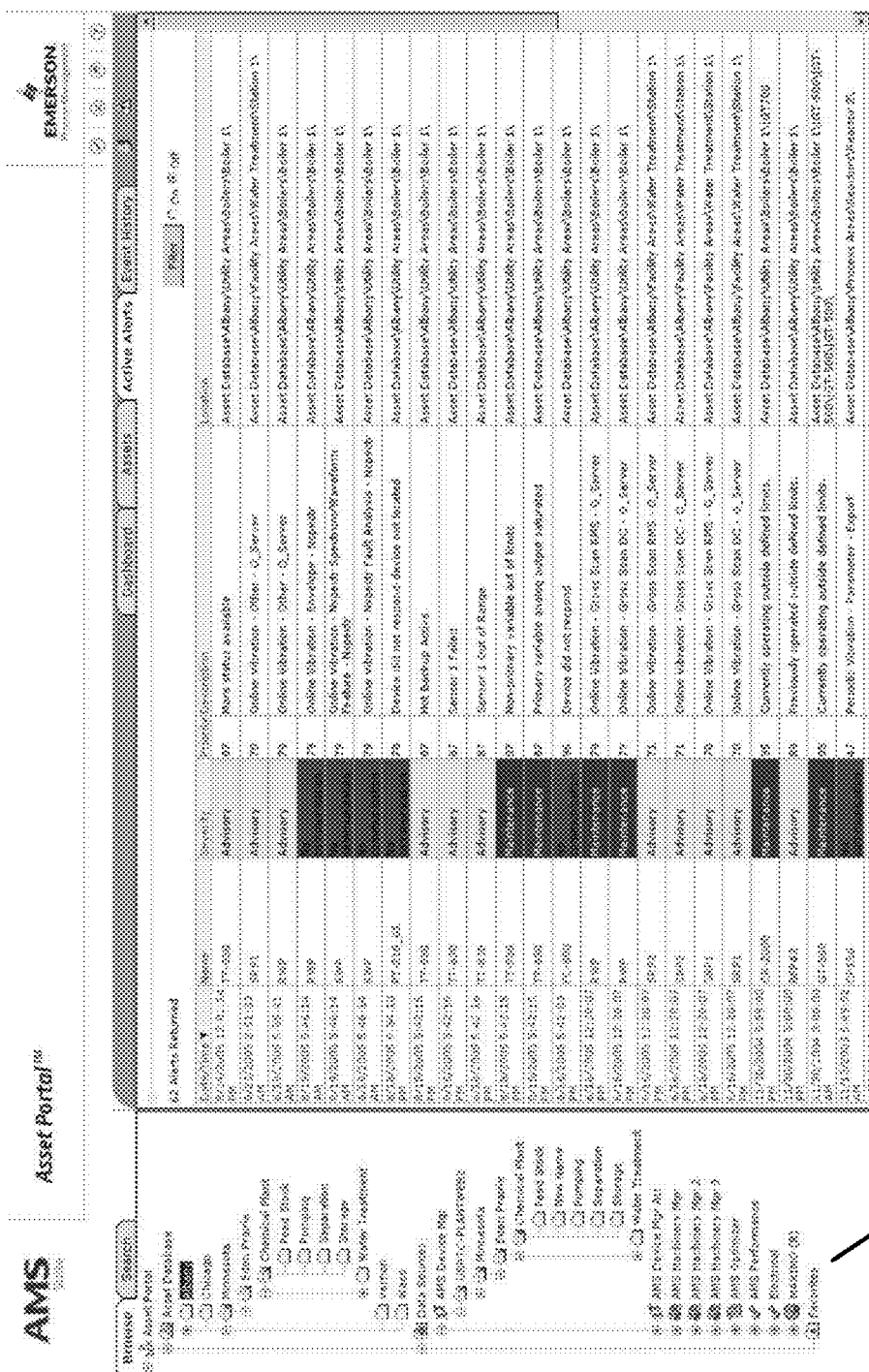
FIG. 11 is an exemplary graphical display that may be provided by a graphical user interface to enable a user to view alert information.

As shown in FIG. 11, a user may view all current alerts or events associated with the plant 10 by selecting the "Active Alerts" tab. The resulting display of active alert information may list each of the of the assets that currently have a problem, along with details regarding the alert such as the date/time, identification of the asset, severity of the alert, criticality of the asset, location, etc. Any or all details regarding an active alert associated with an asset, (e.g., CR-2000) may be displayed as shown in the display of FIG. 7 above. The details may further include recommended actions to be taken given the status information (e.g., maintenance) along with explanations of or the degree of the current status of the asset (e.g., severity, urgency, etc.) and description (e.g. currently operating outside defined limits).

Figure 12:
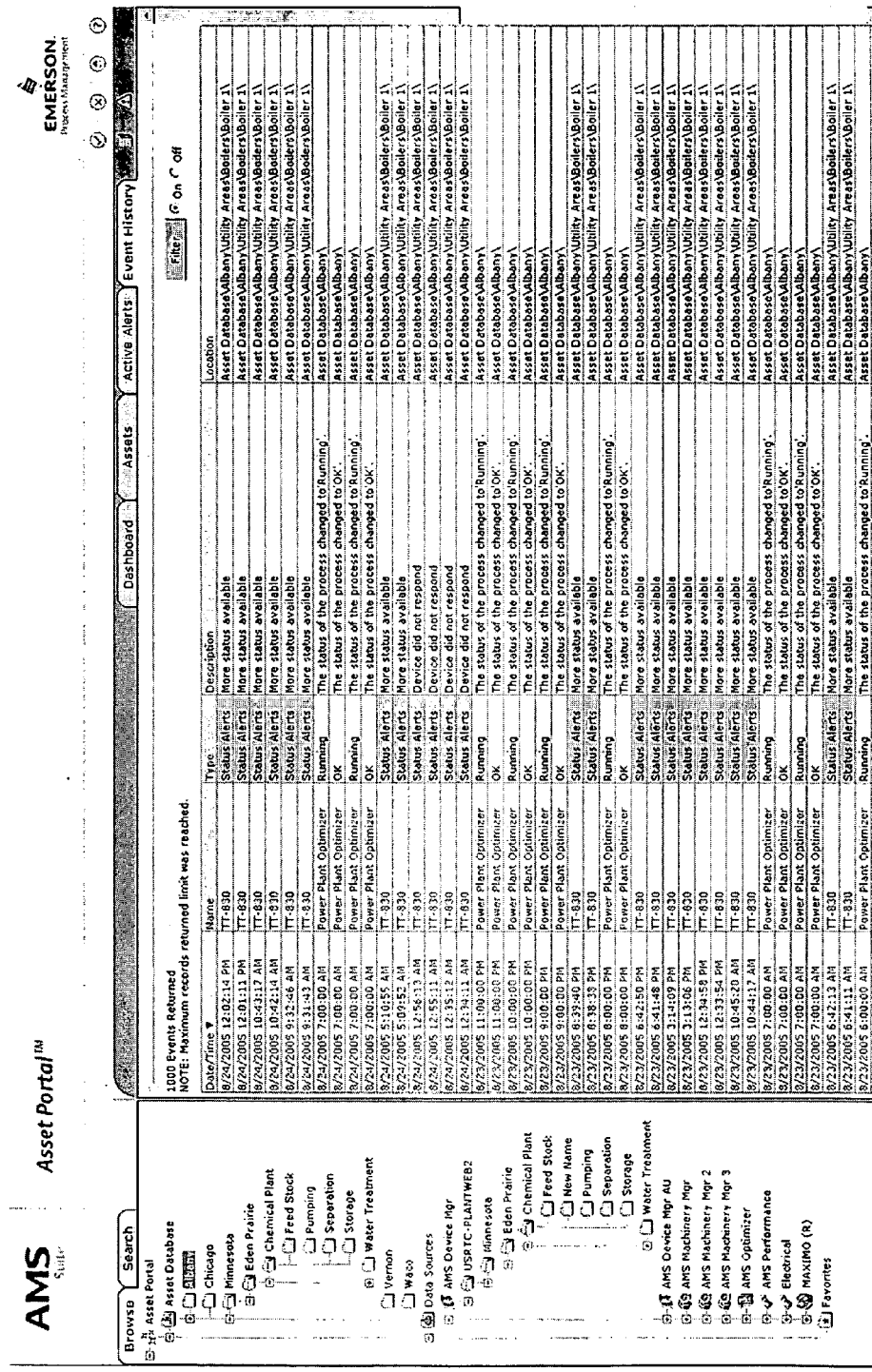
FIG. 12 is an exemplary graphical display that may be provided by a graphical user interface to enable a user to view audit trail information of historical events.
Figure 13:
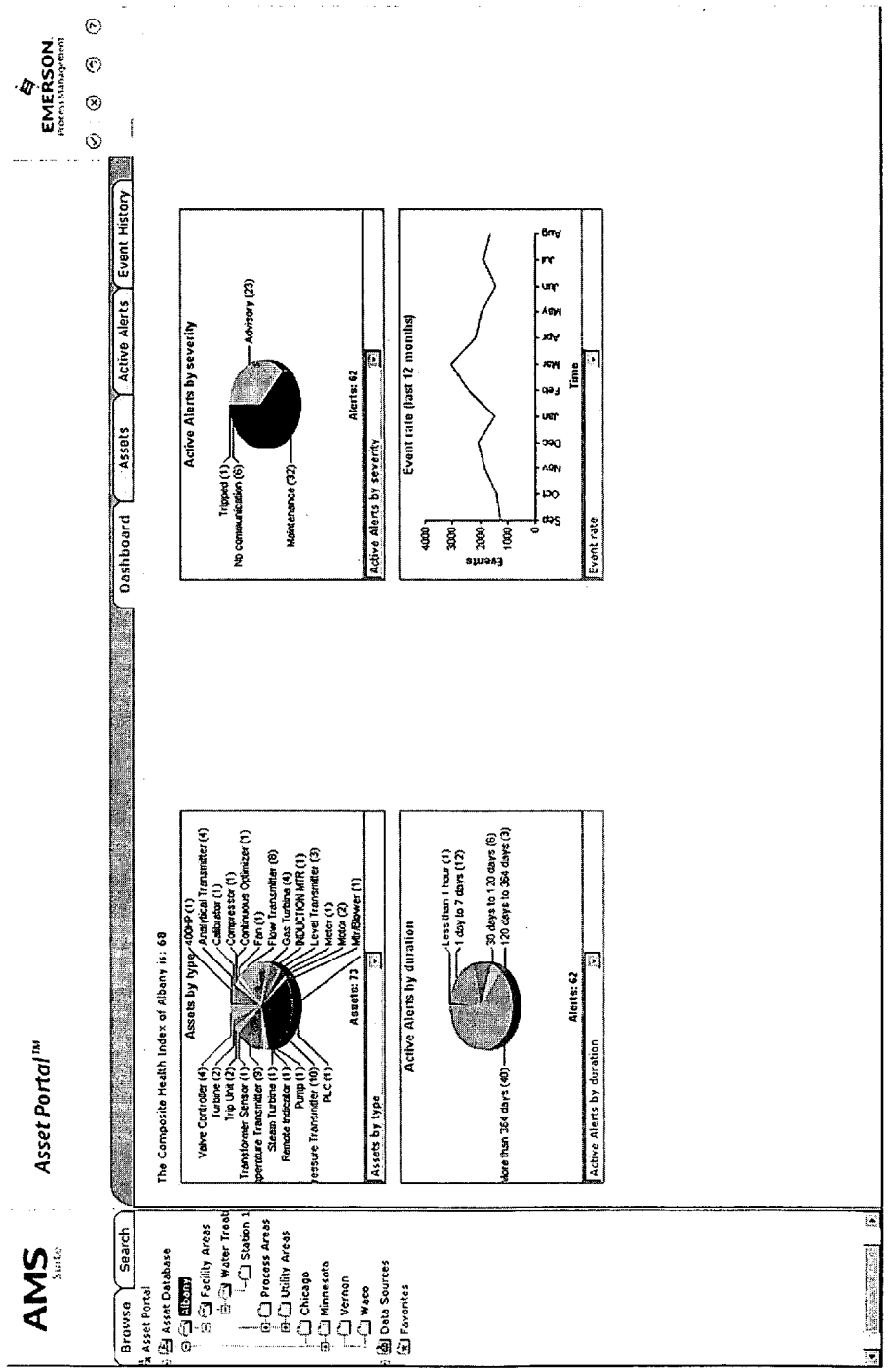
FIGS. 13 and 14 are exemplary graphical displays that may be provided by a graphical user interface to enable a user to view status information of varying levels within a plant.
Figure 14:
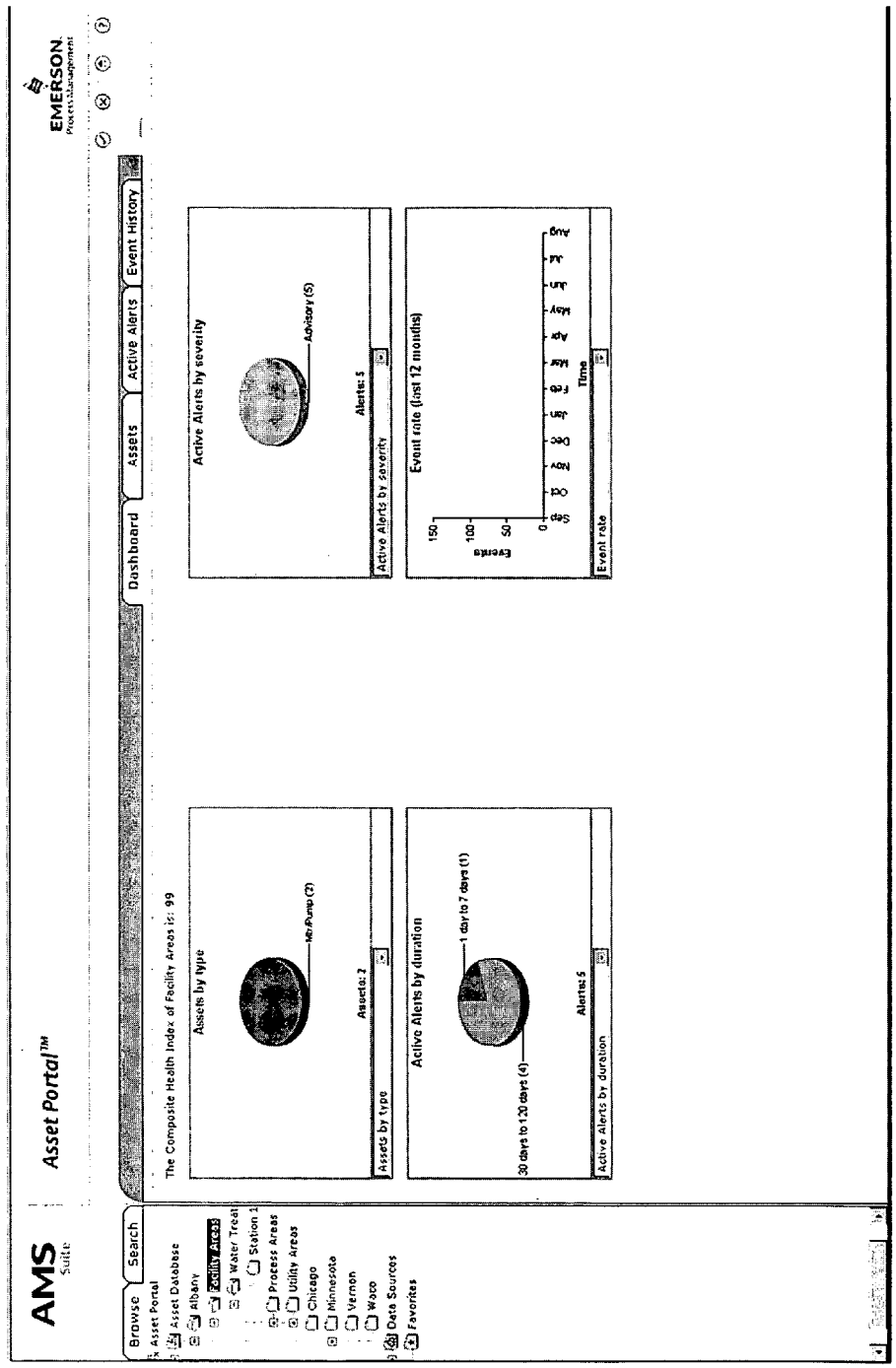
Figure 15:
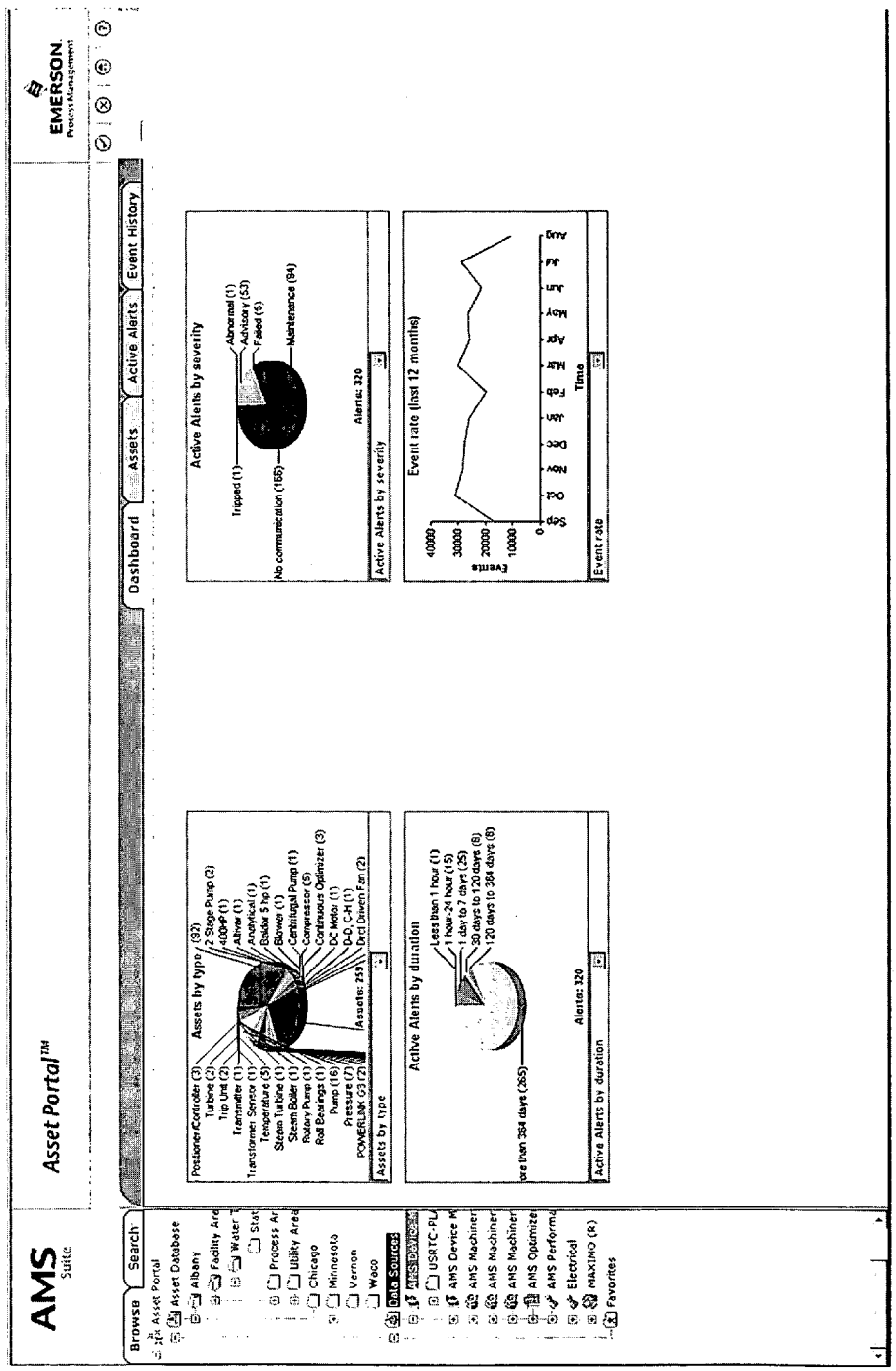
FIGS. 15-17 are exemplary graphical displays that may be provided by a graphical user interface to enable a user to view various data sources within a plant.

As shown in FIG. 12, a historical summary or audit trail may be displayed in response to a user request for "Event History". In this particular example, the history regarding all assets within the plant 10 are displayed to allow the user to quickly assess the progression of the status of each of the assets and the corresponding history. The historical summary may further be used to display a history of all entities within a given location, a history of a particular entity, a history of a particular type of fault, etc. Each historical entry may further be user selectable to display details regarding that particular event. Examples of some of the details that may be listed include date and time of the event, the type of event, a brief description of the event, event location, etc.

Figure 16:
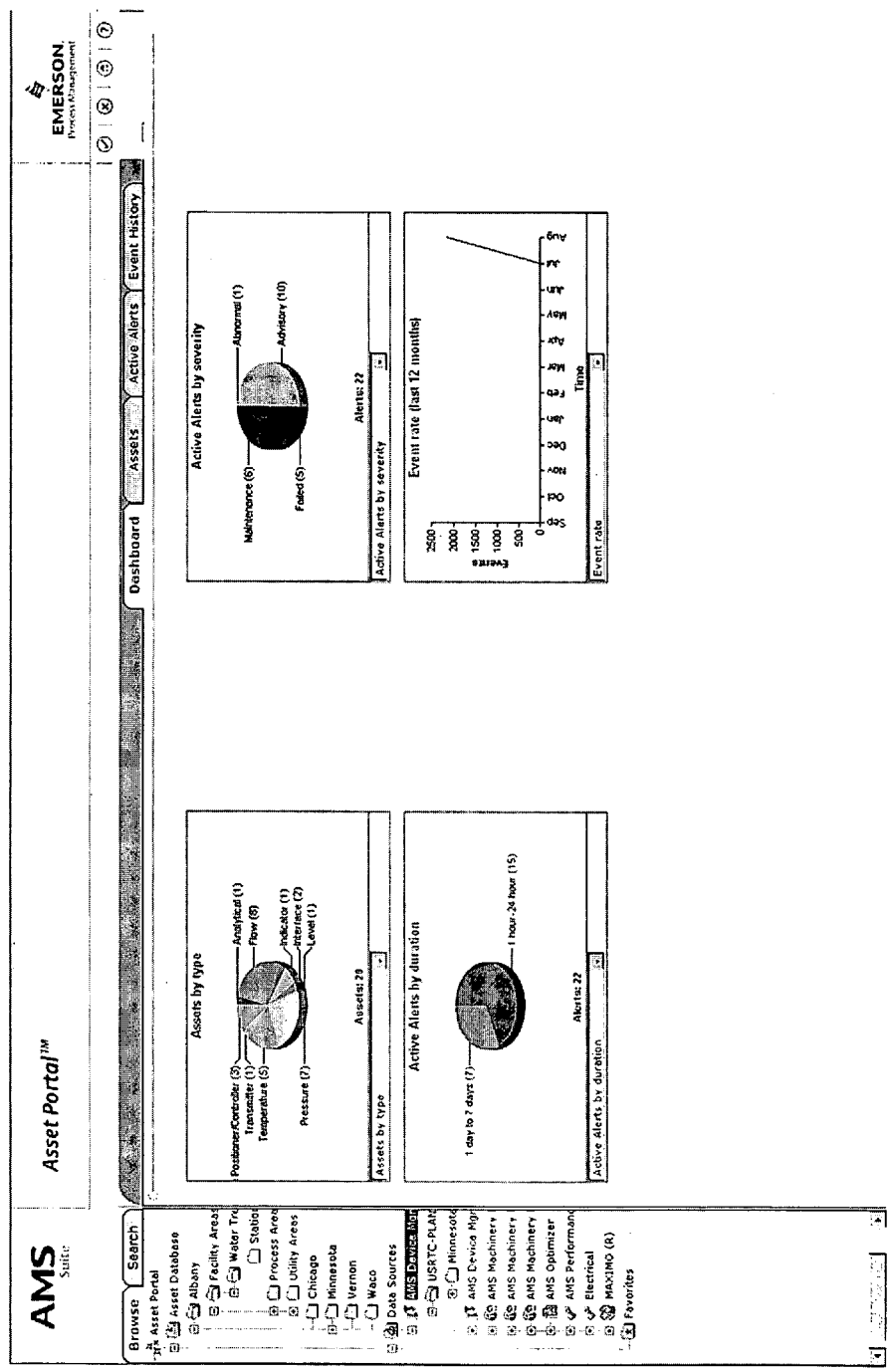
Figure 17:
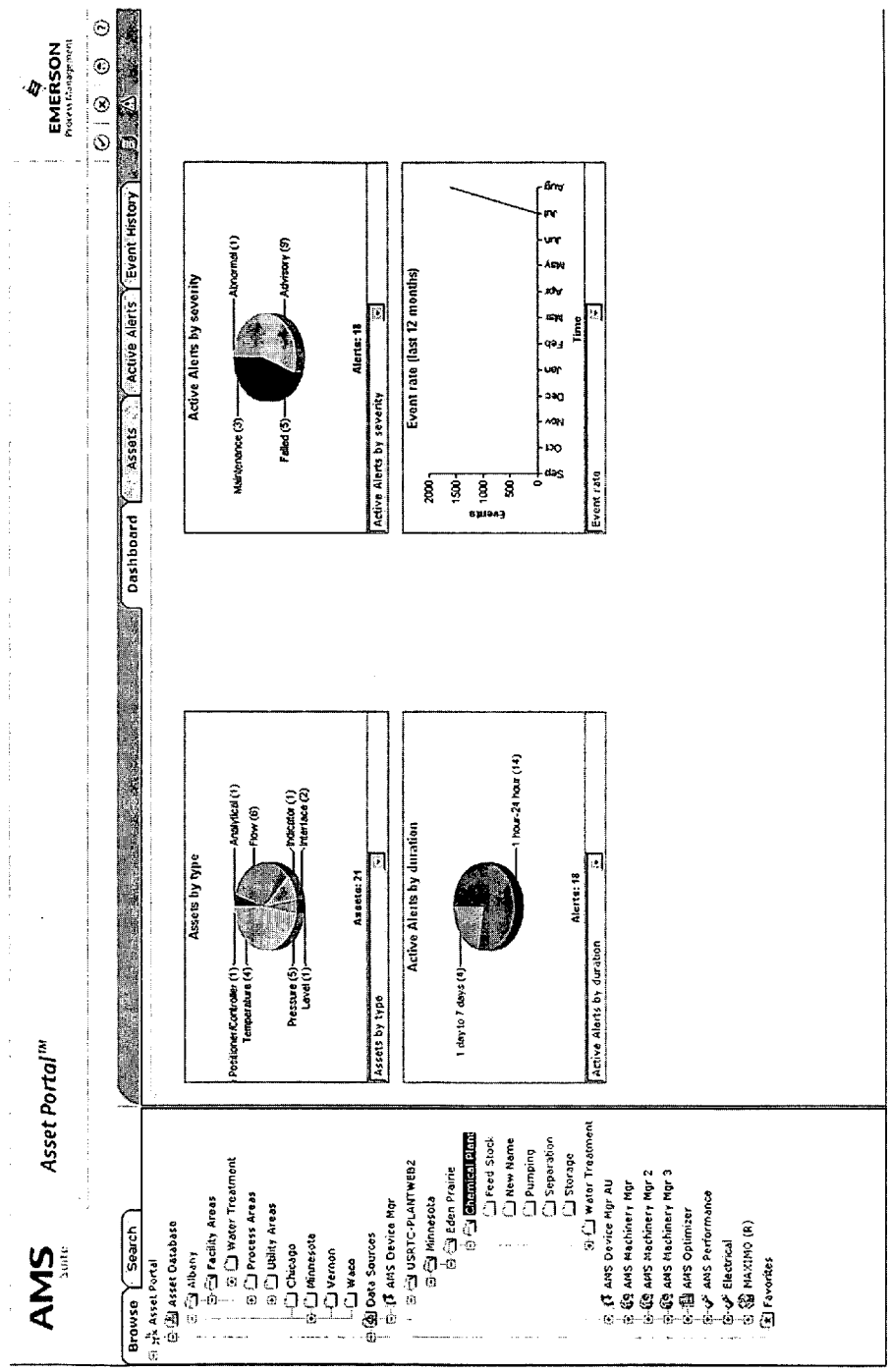

Using the tree level view 300, a user may view various levels and data sources within a plant 10 and corresponding information regarding each level or data source. For example, with reference to FIGS. 14-17, a user may use the tree level view 300 to view an area within the plant 10 (FIG. 14), specific data sources (FIG. 15), data sources by location (FIGS. 16 and 17). Each corresponding view includes a summary of status information regarding each selected view, such as the corresponding assets, alerts, events, etc. Notably with each display, the tabs described above are provided to display asset information, alert information and historical event information as desired by the user.

While the asset monitoring and maintenance system 60 and other process elements have been described as preferably being implemented in software, they may be implemented in hardware, firmware, etc., and may be; implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium). Also, while the asset monitoring and maintenance system 60 is described as possibly being a rule-based expert, other types of expert engines could be used as well, including those which use other known data mining techniques.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of monitoring an entity within a process plant comprising:
    collecting entity status data pertaining to the status of an entity within the process plant while the entity is in operation;
    collecting criticality data pertaining to the importance of the entity within the process plant, wherein the criticality data comprises a quantification of a failure defense planning evaluation of the importance of the entity as the entity affects other entities and/or operations within the process plant;
    collecting corrective measures data pertaining to a corrective measure associated with the entity within the process plant;
    receiving the entity status data, the criticality data and the corrective measures data at a computer system;
    causing the received entity status data and the received criticality data to be concurrently available to perform a further computer implemented function comprising modifying the corrective measure associated with the entity; and
    using two or more of the received entity status data, the received criticality data and the received corrective measures data to perform the further function within the process plant.

2. The method of claim 1, wherein collecting entity status data comprises collecting equipment data pertaining to the status of equipment within the process plant, and wherein using two or more of the received entity status data, the received criticality data and the received corrective measures data to perform the further function comprises using two or more of the equipment data, the received criticality data and the received corrective measures data to perform the further function within the process plant.

3. The method of claim 1, wherein collecting entity status data comprises collecting process control data pertaining to the status of process control activities within the process plant, and wherein using the entity status data and the criticality data to perform a function comprises using the process control data and the criticality data to perform a function within the process plant.

4. The method of claim 1, wherein collecting entity status data comprises performing process performance monitoring to generate process performance data related to the performance of the process, wherein using two or more of the received entity status data, the received criticality data and the received corrective measures data to perform the further function comprises using two or more of the process performance data, the received criticality data and the received corrective measures data to perform the further function within the process plant.

5. The method of claim 1, wherein the entity status data comprises data pertaining to the operation of the entity while the entity is in operation.

6. The method of claim 1, wherein the entity status data comprises diagnostic data pertaining to the entity.

7. The method of claim 1, wherein the entity status data comprises on-line monitoring data pertaining to the entity.

8. The method of claim 1, wherein the entity status data comprises alert data pertaining to a problem with the entity.

9. The method of claim 1, wherein the function within the process plant comprises a diagnostic function and wherein using two or more of the received entity status data, the received criticality data and the received corrective measures data to perform the further function comprises using two or more of the received entity status data, the received criticality data and the received corrective measures data to perform a diagnostic function.

10. The method of claim 9, wherein the diagnostic function comprises at least one of the group consisting of: an equipment monitoring diagnostic function, a process control diagnostic function and a process performance diagnostic function.

11. The method of claim 1, wherein the function within the process plant comprises a process control function and wherein using two or more of the received entity status data, the received criticality data and the received corrective measures data to perform the further function comprises using two or more of the received entity status data, the received criticality data and the received corrective measures data to change a process control parameter.

12. The method of claim 1, wherein the function within the process plant comprises a viewing function and wherein using two or more of the received entity status data, the received criticality data and the received corrective measures data to perform the further function comprises creating and displaying a display screen via a display terminal using two or more of the received entity status data, the received criticality data and the received corrective measures data.

13. The method of claim 12, further comprising storing a representation of the entity and displaying the entity status data and the criticality data proximately to the corresponding representation.

14. The method of claim 12, wherein displaying the display screen comprising displaying the display screen via a web interface.

15. The method of claim 12, further comprising displaying entity alarm data pertaining on a display screen.

16. The method of claim 1, wherein the function comprises a maintenance function and wherein using two or more of the received entity status data, the received criticality data and the received corrective measures data to perform the further function comprises using two or more of the received entity status data, the received criticality data and the received corrective measures data to perform a maintenance function.

17. The method of claim 1, wherein the function comprises a decision function and wherein using two or more of the received entity status data, the received criticality data and the received corrective measures data to perform the further function comprises using two or more of the received entity status data, the received criticality data and the received corrective measures data to execute a decision within the process plant.

18. The method of claim 17, wherein using two or more of the received entity status data, the received criticality data and the received corrective measures data to execute a decision comprises using two or more of the received entity status data, the received criticality data and the received corrective measures data to analyze the entity.

19. The method of claim 17, wherein using two or more of the received entity status data, the received criticality data and the received corrective measures data to execute a decision comprises using two or more of the received entity status data, the received criticality data and the received corrective measures data to analyze an aspect of the process plant other than the entity.

20. The method of claim 17, wherein using two or more of the received entity status data, the received criticality data and the received corrective measures data to execute a decision comprises using two or more of the received entity status data, the received criticality data and the received corrective measures data to initiate an automated process.

21. The method of claim 17, wherein using two or more of the received entity status data, the received criticality data and the received corrective measures data to execute a decision comprises using two or more of the received entity status data, the received criticality data and the received corrective measures data to optimize control of the entity.

22. The method of claim 17, wherein using two or more of the received entity status data, the received criticality data and the received corrective measures data to execute a decision comprises using two or more of the received entity status data, the received criticality data and the received corrective measures data to adjust a parameter of the entity.

23. The method of claim 1, wherein the entity status data comprises a use index pertaining to the status of the entity.

24. The method of claim 23, wherein the use index comprises a health index indicating the health of the entity.

25. The method of claim 23, wherein the use index comprises a performance index indicating the relative performance of the entity.

26. The method of claim 23, wherein the use index comprises a variability index indicating an amount of deviation of a parameter of the entity.

27. The method of claim 23, wherein the use index comprises a utilization index indicating a degree of exploitation of the entity.

28. A process control system within a process plant comprising:
  equipment monitoring devices that collect equipment data pertaining to the status of equipment within the process plant while an entity is in operation;
  a database adapted to store criticality data pertaining to the importance of the entity within the process plant, wherein the criticality data comprises a quantification of a failure defense planning evaluation of the importance of the entity as the entity affects other entities and/or operations within the process plant;
  a computer maintenance management system adapted to provide corrective measures data pertaining to a corrective measure associated with the entity; and
  a computer system operatively coupled to the database that implements a software routine that receives the criticality data, the equipment data and the corrective measures data, wherein the received equipment status data, the received criticality data and the received corrective measures data are concurrently available to the software routine to perform a further function comprising modifying the corrective measure associated with the entity, and the software routine uses two or more of the equipment data, the criticality data and the corrective measures data to perform the further function within the process plant.

29. The system of claim 28, wherein the status data comprises data pertaining to the operation of the equipment while the equipment is in operation.

30. The system of claim 28, wherein the status data comprises diagnostic data pertaining to the equipment.

31. The system of claim 28, wherein the status data comprises on-line monitoring data pertaining to the equipment.

32. The system of claim 28, wherein the status data comprises alert data pertaining to a problem with the equipment.

33. The system of claim 28, wherein the function within the process plant comprises a diagnostic function and wherein the software routine comprises a diagnostic routine that combines two or more of the equipment data, the criticality data and the corrective measures data to perform a diagnostic function.

34. The system of claim 28, wherein the function within the process plant comprises a process control function and wherein the software routine comprises a process control routine that uses two or more of the equipment data, the criticality data and the corrective measures data to change a process control parameter.

35. The system of claim 28, wherein the function within the process plant comprises a viewing function and wherein the software routine is adapted to create and display a display screen via a display terminal using two or more of the equipment data, the criticality data and the corrective measures data.

36. The system of claim 35, wherein the software routine is adapted to store a representation of the equipment and further adapted to display two or more of the equipment data, the criticality data and the corrective measures data proximately to the representation.

37. The system of claim 35, wherein the equipment monitoring devices, the database and the computer system are coupled via an internet, and wherein the software routine comprises a web interface.

38. The system of claim 35, wherein the software routine displays entity alarm data pertaining on a display screen.

39. The system of claim 28, wherein the function comprises a maintenance function and wherein the software routine comprises a maintenance routine that uses two or more of the equipment data, the criticality data and the corrective measures data to perform a maintenance function.

40. The system of claim 28, wherein the function comprises a decision function and wherein the software routine comprises a decision routine that uses two or more of the equipment data, the criticality data and the corrective measures data to execute a decision within the process plant.

41. The system of claim 40, wherein the decision routine comprises an analysis routine that uses two or more of the equipment data, the criticality data and the corrective measures data to analyze the equipment.

42. The system of claim 40, wherein the decision routine comprises an analysis routine that uses two or more of the equipment data, the criticality data and the corrective measures data to analyze an aspect of the process plant other than the equipment.

43. The system of claim 40, wherein the decision routine comprises an automation routine that uses two or more of the equipment data, the criticality data and the corrective measures data to initiate an automated process.

44. The system of claim 40, wherein the decision routine comprises an optimization routine that uses two or more of the equipment data, the criticality data and the corrective measures data to optimize control of the equipment.

45. The system of claim 40, wherein the decision routine comprises an adjustment routine that uses two or more of the equipment data, the criticality data and the corrective measures data to adjust a parameter of the equipment.

46. The system of claim 28, wherein the status data comprises a use index pertaining to the status of the equipment.

47. The system of claim 46, wherein the use index comprises one or more of the following: a health index indicating the health of the equipment, a performance index indicating the relative performance of the equipment, a variability index indicating an amount of deviation of a parameter of the equipment, and a utilization index indicating a degree of exploitation of the equipment.

48. A method of monitoring an entity having a plurality of lower level entities within a process plant, the method comprising:
    receiving status data pertaining to the status of each of the lower level entities while each lower level entity is in operation;
    receiving criticality data pertaining to the importance of each lower level entity among the plurality of lower level entities to the entity, wherein the criticality data comprises a quantification of a failure defense planning evaluation of the importance of each of the plurality of lower level entities to the entity as the entity affects other entities and/or operations within the process plant;
    receiving corrective measures data pertaining to a corrective measure associated with one or more of the lower level entities;
    causing the received entity status data and the received criticality data to be concurrently available to perform a further computer implemented function within the process plant comprising modifying the corrective measure associated with the one or more of the lower level entities; and
    using two or more of the status data, the criticality data and the corrective measures data to perform the further function within the process plant.

49. The method of claim 48 wherein receiving status data pertaining to the status of the plurality of lower level entities comprises receiving status data pertaining to the operation of each of the plurality of lower level entities while each lower level entity is in operation.

50. The method of claim 48 wherein the function comprises a viewing function and wherein using two or more of the status data, the criticality data and the corrective measures data to perform a function comprises displaying a representation of the entity, displaying status data pertaining to the status of the entity proximately to the representation of the entity.

51. The method of claim 50 further comprising:
    displaying a representation of each of the lower level entities;
    displaying status data pertaining to the status of each the lower level entities proximately to each corresponding representation; and
    displaying criticality data pertaining to the importance of each of the lower level entities within the entity proximately to each corresponding representation.

52. The method of claim 48 wherein the function comprises a diagnostic function and wherein using the using two or more of the status data, the criticality data and the corrective measures data to perform a function comprises using two or more of the status data, the criticality data and the corrective measures data to perform a diagnostic function pertaining to the entity.

53. The method of claim 52 wherein using two or more of the status data, the criticality data and the corrective measures data to perform a diagnostic function comprises using two or more of the status data, the criticality data and the corrective measures data to perform a diagnostic function pertaining to at least one of the plurality of lower level entities.

54. The method of claim 48 wherein the function comprises a process control function and wherein using two or more of the status data, the criticality data and the corrective measures data to perform a function comprises using two or more of the status data, the criticality data and the corrective measures data to change a process control parameter of the entity.

55. The method of claim 54 wherein using two or more of the status data, the criticality data and the corrective measures data to change a process control parameter of the entity comprises using two or more of the status data, the criticality data and the corrective measures data to change a process control parameter of a lower level entity.

56. The method of claim 48 wherein the function comprises a maintenance function and wherein using two or more of the status data, the criticality data and the corrective measures data to perform a function comprises two or more of the status data, the criticality data and the corrective measures data to perform a maintenance function related to a lower level entity.

57. The method of claim 48 wherein the function comprises a decision function and wherein using two or more of the status data, the criticality data and the corrective measures data to perform a function comprises using two or more of the status data, the criticality data and the corrective measures data to execute a decision within the process plant.

58. The method of claim 57 wherein using two or more of the status data, the criticality data and the corrective measures data to execute a decision comprises using two or more of the status data, the criticality data and the corrective measures data to analyze a lower level entity.

59. The method of claim 57 wherein using two or more of the status data, the criticality data and the corrective measures data to execute a decision comprises using two or more of the status data, the criticality data and the corrective measures data to analyze the entity.

60. The method of claim 57 wherein using two or more of the status data, the criticality data and the corrective measures data to execute a decision comprises using two or more of the status data, the criticality data and the corrective measures data to optimize control of a lower level entity.

61. The method of claim 57 wherein using two or more of the status data, the criticality data and the corrective measures data to execute a decision comprises using two or more of the status data, the criticality data and the corrective measures data to optimize control of the entity.

\* \* \* \* \*